US008156293B2

(12) United States Patent
Shitomi et al.

(10) Patent No.: US 8,156,293 B2
(45) Date of Patent: Apr. 10, 2012

(54) METHOD AND APPARATUS FOR A UNIFIED STORAGE SYSTEM

(75) Inventors: Hidehisa Shitomi, Mountain View, CA (US); Yasunori Kaneda, San Jose, CA (US); Akira Yamamoto, Kanagawa (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/228,145

(22) Filed: Sep. 8, 2011

(65) Prior Publication Data

US 2011/0320642 A1    Dec. 29, 2011

Related U.S. Application Data

(63) Continuation of application No. 12/968,475, filed on Dec. 15, 2010, now Pat. No. 8,037,260, which is a continuation of application No. 11/729,836, filed on Mar. 30, 2007, now Pat. No. 7,877,556.

(51) Int. Cl.
    *G06F 13/00* (2006.01)
(52) U.S. Cl. ..................... 711/156; 711/154; 711/163
(58) Field of Classification Search .................. 711/154, 711/156, 163
    See application file for complete search history.

(56) References Cited

U.S. PATENT DOCUMENTS

| | | | |
|---|---|---|---|
| 5,990,810 A | 11/1999 | Williams | |
| 6,748,502 B2 | 6/2004 | Watanabe et al. | |
| 6,880,059 B2 | 4/2005 | Mizuno et al. | |
| 7,058,759 B1 | 6/2006 | Reiser et al. | |
| 7,216,264 B1 | 5/2007 | Glade et al. | |
| 7,313,557 B1 | 12/2007 | Noveck | |
| 7,315,914 B1 | 1/2008 | Venkatanarayanan et al. | |
| 7,460,473 B1 | 12/2008 | Kodama et al. | |
| 7,464,222 B2 | 12/2008 | Matsunami et al. | |
| 7,877,556 B2 * | 1/2011 | Shitomi et al. | 711/154 |
| 8,037,260 B2 * | 10/2011 | Shitomi et al. | 711/154 |
| 2004/0030822 A1 | 2/2004 | Rajan et al. | |

(Continued)

FOREIGN PATENT DOCUMENTS

JP        7-334449 A      12/1995

(Continued)

OTHER PUBLICATIONS

"NetApp Enterprises Storage", Network Appliances-Enterprise Storage Products, Network Appliance Inc., pp. 1-2, http://www.netapp.com/products/storage-systems/enterprise-storage/index.html, 2007.

(Continued)

*Primary Examiner* — Reba I Elmore
(74) *Attorney, Agent, or Firm* — Mattingly & Malur, P.C.

(57) ABSTRACT

A unified storage system for executing a variety of types of storage control software using a single standardized hardware platform includes multiple storage control modules connected to storage devices for storing data related to input/output (I/O) operations. A first type of storage control software is initially installed and executed on a first storage control module for processing a first type of I/O operations. A management module replaces the first type of storage control software by installing a second type of storage control software onto the first storage control module. When the second type of storage control software is installed and executed, the first storage control module processes a second type of I/O operation, different from the first type of I/O operation. Control of volumes originally accessed by the first storage control module may be transferred to a second storage control module having the first type of storage control software installed.

14 Claims, 18 Drawing Sheets

U.S. PATENT DOCUMENTS

| | | |
|---|---|---|
| 2004/0078654 A1 | 4/2004 | Holland et al. |
| 2004/0260993 A1 | 12/2004 | Griffin et al. |
| 2005/0071545 A1 | 3/2005 | Karpoff et al. |
| 2005/0190393 A1 | 9/2005 | Bledsoe et al. |
| 2005/0210084 A1 | 9/2005 | Goldick et al. |
| 2006/0123386 A1 | 6/2006 | Tameshige et al. |
| 2006/0282457 A1 | 12/2006 | Williams |
| 2007/0011272 A1 | 1/2007 | Bakke et al. |
| 2007/0208788 A1 | 9/2007 | Chakravarty et al. |

FOREIGN PATENT DOCUMENTS

| | | | |
|---|---|---|---|
| JP | 2000-148651 A | 5/2000 | |
| JP | 2002-324000 A | 11/2002 | |
| JP | 2003-162377 A | 6/2003 | |

OTHER PUBLICATIONS

"NetApp V-Series Storage Virtualization Systems", Network Appliance-Storage Virtualization Products-V-Series, Network Appliance Inc., pp. 1-2, http://www.netapp.com/products/enterprise-systems/virtualized-storage/index.html, 2007.

"Pillar Data Systems Products", Pillar Data Systems, pp. 1-2, http://www.pillardata.com/products, 2007.

"Reldata 9200-Overview", Reldata—Universal iSCSI SAN, NAS and Replication Systems, Reldata Inc., pp. 1-3, http://www.reldata.com, 2007.

"Compellant Delivers Investment Protection", Compellant Products: Technology Independence, Compellant Inc., pp. 1-2, http://www.compellant.com/products, 2007.

* cited by examiner

| Storage Controller Module # | Assigned Program | Vendor | Version | Data Volume | Status |
|---|---|---|---|---|---|
| 2200 | Block | Hitachi | 7.0 | 040, 041, 042 | Online |
| 2300 | CAS | Hitachi | 2.0 | 010, 011, 012 | Online |
| 2400 | VTL | Hitachi | 1.0 | 050, 051, 052 | Online |
| 2500 | Block | Hitachi | 7.0 | 030, 031, 032 | Online |
| 2600 | N/A | - | - | - | Offline |

Storage Control Module Management Table

FIG. 3

| Assigned Program | Vendor | Version | Stored Volume # |
|---|---|---|---|
| NAS | Hitachi | 4.0 | 2922 |
| NAS | Hitachi | 5.0 | 2928 |
| CAS | Hitachi | 2.0 | 2923 |
| VTL | Hitachi | 1.0 | 2924 |
| VDL | Hitachi | 1.0 | 2925 |
| Block | Hitachi | 7.0 | 2921 |
| Block | Hitachi | 8.0 | 2929 |
| OOS | Hitachi | 3.0 | 2926 |

Storage Control Software Management Table

FIG. 4

| Volume # | Assigned Storage Control Module # | Associated Storage Control Module WWN |
|---|---|---|
| 000 | 2200 | 2213 |
| 001 | 2200 | 2213 |
| 010 | 2300 | 2313 |

Volume Management Table

FIG. 5

| Volume # | WWN of Host that is Permitted Access |
|---|---|
| 000 | 1003 |
| 001 | 1003, 2003 |
| 010 | 2003 |

LUN Security Table

FIG. 6

| Release No. | Storage Controller Module # | Assigned Program | Vendor | Version | Data Volume |
|---|---|---|---|---|---|
| 001 | 2200 | NAS | Hitachi | 5.0 | 000, 001, 002 |
| 002 | 2400 | Block | Hitachi | 6.0 | 020, 021, 022 |

Volume Release Management Table

FIG. 7A

| Release No. | Storage Controller Module # | Assigned Program | Vendor | Version | Data Volume | LUN Security |
|---|---|---|---|---|---|---|
| 001 | 2200 | NAS | Hitachi | 5.0 | 000 | 1003 |
| | | | | | 001 | 1003, 2003 |
| | | | | | 002 | 1003 |
| 002 | 2400 | Block | Hitachi | 6.0 | 020 | 3003 |
| | | | | | 021 | 3003 |
| | | | | | 022 | 4003 |

Volume Release Management Table with LUN Security

FIG. 7B

Load Management Table

Process to Allocate Empty Volume to a Storage Control Module

Process for Path Definition

Process to Re-allocate a Storage Control Module

Load Balancing Procedure Performed by Load Balancing Program

Target Storage Control Module Selection

METHOD AND APPARATUS FOR A UNIFIED STORAGE SYSTEM

This application is a continuation of U.S. patent application Ser. No. 12/968,475, filed Dec. 15, 2010, now allowed, which is a continuation of U.S. patent application Ser. No. 11/729,836 filed Mar. 30, 2007, now U.S. Pat. No. 7,877,556, the contents of which are hereby incorporated by reference into this application.

BACKGROUND OF THE INVENTION

1. Field of the Invention

The present invention relates generally to storage systems, such as unified storage systems.

2. Description of Related Art

Unified storage is a concept whereby multiple different types of storage technologies can be implemented using a single hardware platform. As the hardware components of storage systems have become more standardized, such as through the use of standard CPUs, standard memory modules, etc., different types of storage control software are able to run on the same storage hardware platform. A primary advantage of a unified storage system is a reduction in hardware requirements, so that a single hardware system can be used for a variety of storage uses. A unified storage system should, at a minimum, simultaneously enable storage of file-type data and storage of the block-based input/output (I/O) operations produced by enterprise application programs. Instead of having to provide separate storage platforms, such as a network attached storage (NAS) system for file-based storage and a RAID disk array for block-based storage, a unified storage system should be able to be used for either function independently, while also being able to combine both functions for simultaneous use. Further, a unified storage system should also be able to incorporate and perform more advanced storage technologies, such as CAS (Content Addressable Storage), VTL (Virtual Tape Library), VDL (Virtual Disk Library), OOS (Object-Oriented Storage), and so on.

Current Solutions and Their Problems

Most conventional storage systems are still single control type systems, which means they are either block based storage systems, NAS systems, CAS systems, VTL systems, VDL systems, OOS systems, etc. However, some vendors have begun to provide multiple control systems. These multiple control systems are typically a NAS platform that is modified to add block-storage support, although some are a combination of FC-SAN (Fibre Channel-Storage Area Network) and IP-SAN (Internet Protocol-Storage Area Network) (iSCSI) block-based storage, or a combination of NAS and iSCSI (Internet Small Computer System Interface).

However, the prior art systems are all static systems in that they are specifically configured to handle one or two predetermined protocols, rather than being able to dynamically change to accommodate different protocols. Thus, the prior art systems suffer from an inability to automatically and dynamically install and run the different forms of storage control software on other hardware platforms in order to dynamically and flexibly change the tasks that the system is able to carry out. For example some prior art unified storage systems are able to provide block-based (FC and iSCSI) and file system control simultaneously. However, the controls for these systems may be based in the common OS and File System layer running on one hardware platform. Therefore, even when providing block-based functionality, the operations have to be handled by the file system layer, which creates undesirable overhead, and thereby decreases the efficiency of the block-based storage. Also, such a setup makes it difficult to change between block and file configurations after starting up the system. Moreover, the system is not able to automatically and dynamically change its configuration based on the system load so as to better balance the load.

BRIEF SUMMARY OF THE INVENTION

The invention discloses methods and apparatuses for providing a unified storage system. The unified storage system of this invention can enable multiple types of storage control such as block-based storage, NAS storage using file systems, CAS ability, VTL storage, VDL storage, OOS and the like, by utilizing a standard hardware platform for the storage system. The unified storage system of the invention is able to flexibly and dynamically change the storage control software running on each storage control module for implementing the various storage technologies. These and other features and advantages of the present invention will become apparent to those of ordinary skill in the art in view of the following detailed description of the preferred embodiments.

BRIEF DESCRIPTION OF THE DRAWINGS

The accompanying drawings, in conjunction with the general description given above, and the detailed description of the preferred embodiments given below, serve to illustrate and explain the principles of the preferred embodiments of the best mode of the invention presently contemplated.

FIG. 3 illustrates an example of a storage control module management table.

FIG. 4 illustrates an example of a storage control software management table.

FIG. 5 illustrates an example of a volume management table.

FIG. 6 illustrates an example of a LUN security table.

FIG. 7A illustrates an example of a volume release management table according to the invention.

FIG. 7B illustrates another example of a volume release management table including LUN security.

DETAILED DESCRIPTION OF THE INVENTION

Figure 1:
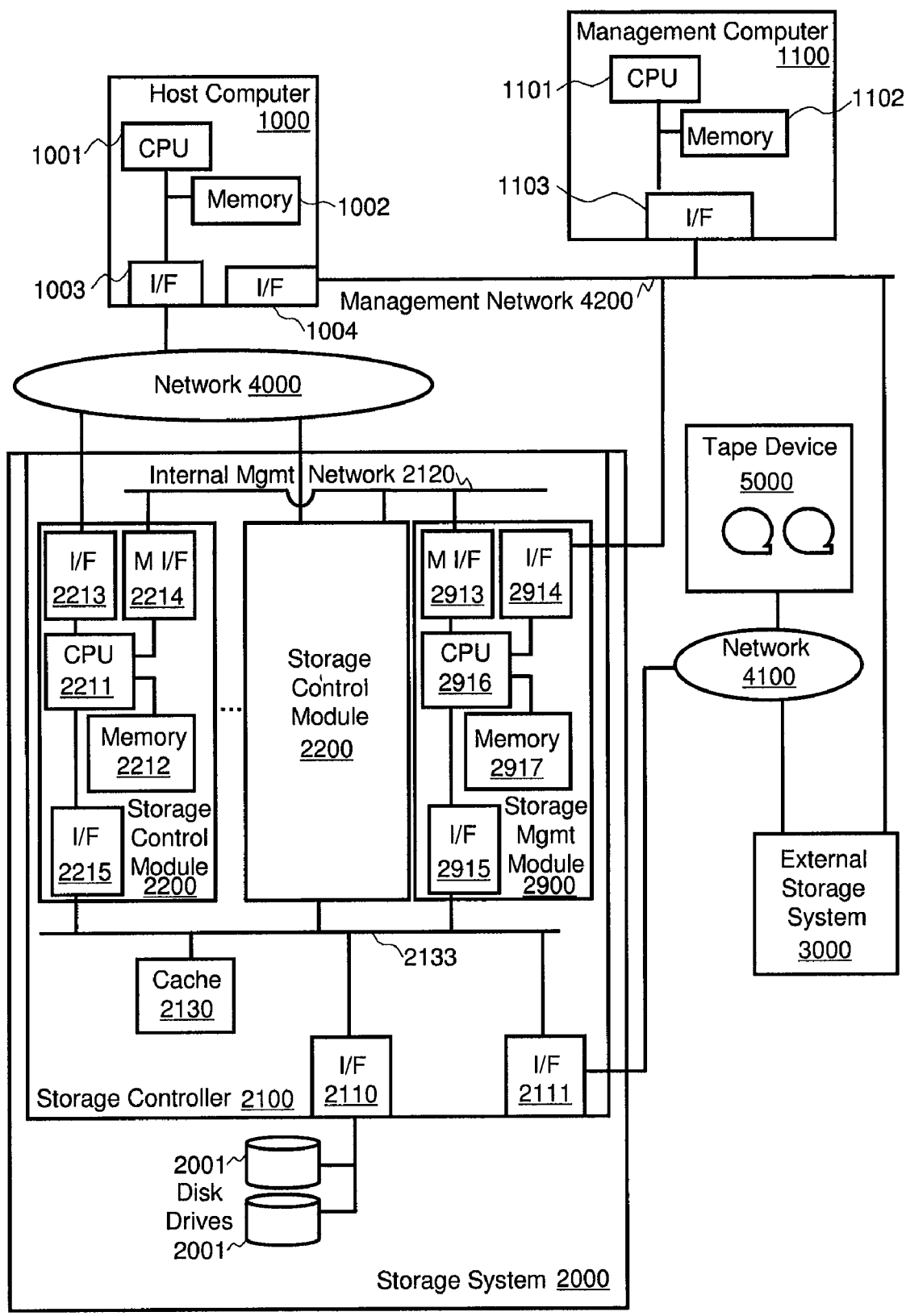
FIG. 1 illustrates an example of a hardware configuration in which the method and apparatus of the invention may be applied.

In the following detailed description of the invention, reference is made to the accompanying drawings which form a part of the disclosure, and, in which are shown by way of illustration, and not of limitation, specific embodiments by which the invention may be practiced. In the drawings, like numerals describe substantially similar components throughout the several views. Further, the drawings, the foregoing discussion, and following description are exemplary and explanatory only, and are not intended to limit the scope of the invention or this application in any manner.

The invention discloses methods and apparatuses for providing a true unified storage system. The unified storage system of the invention includes multiple control modules having standardized hardware configurations, and is able to flexibly change the storage control software, such as block-based, NAS, CAS, VTL, VDL, OOS etc., running on each storage control module, while also preserving the data and configuration during the reallocation of storage control. To realize these features, the invention includes methods for installing storage control software to a free storage control module, and further includes methods for uninstalling storage control software from a storage control module, and re-installing storage control software to a storage control module. During the processes for uninstalling and reinstalling storage control software, the data and system configurations, such as information regarding host connections to volumes, the data in the volumes, etc., can be preserved and utilized following the re-installation process. Moreover, the system of the invention is able to automatically change its configuration in order to balance the system load without requiring the intervention of an administrator, or the like.

First Embodiments

System Configurations

FIG. 1 illustrates an example of a hardware configuration in which the method and apparatus of this invention may be applied. The information system of the invention may include one or more storage systems 2000, one or more management computers 1100, and one or more host computers 1000.

Host computer 1000 may be included for conducting I/O operations, such as for storing data to storage system 2000. Host computer 1000 includes a host CPU 1001 and a host memory 1002. Host computer 1000 may use an interface I/F 1003 for connecting to storage system 2000 via a network 4000, or alternatively, may be directly attached to the storage system 2000. The typical media type of network 4000 maybe Fibre Channel (FC), Ethernet, or the like, although any appropriate network media can be used under the invention. The host computer may also include an I/F 1004 for connecting to management computer 1100 via a management network 4200. The typical media type of management network 4200 may be Ethernet, but other appropriate network media may also be used under the invention. Further, management network 4200 may be the part of the same network as network 4000, or a separate network.

Management computer 1100 is provided for running management software described in greater detail below. Management computer 1100 includes a management CPU 1101 and a management memory 1102. The management computer includes an I/F 1103 to enable connection to storage system 2000 and host computer 1000 via management network 4200.

Storage system 2000 includes a storage controller 2100 and one or more storage devices 2001, such as hard disk drives. Storage controller 2100 includes a plurality of storage control modules 2200 for processing I/O operations, such as from host computer 1000, and for controlling the reading and writing of data to and from storage devices 2001. Storage controller 2100 also includes a storage management module 2900 for managing storage system 2000, and a cache memory 2130 for facilitating I/O operations.

Each storage control module 2100 includes a CPU 2211, a memory 2212, a host interface 2213, a management interface 2214, and internal interface 2215. CPU 2211 and memory 2212 are used for loading and executing storage control software discussed further below, which processes I/O requests or other operations. The storage control software is stored into memory 2212 and executed by CPU 2211. Host interface 2213 is used to connect between host computer 1000 and storage control module 2200 via network 4000. The specific type of I/F 2213 is dependent on the type of network 4000 provided, as discussed above. Management interface 2214 is used to connect each storage control module 2200 for communication with storage management module 2900 and other storage control modules 2200 via an internal management network 2120. Ethernet may be a typical example of the network media used for internal management network 2120, although a system bus such as PCI may also used for the internal management network 2120. Internal Interface 2215 is used to connect between storage control module 2200 and a storage system internal bus 2133 or internal switched network used for communication between the storage control modules 2200, the cache memory 2130 and disk interfaces 2110 and 2111.

Storage management module 2900 processes management operations received from management computer 1100, and includes a CPU 2916, a memory 2917, an internal management interface 2913, an external management interface 2914, and an internal interface 2915. Storage management related software (discussed further below) is stored in the memory 2917 and executed by CPU 2916 for processing storage management requests or other operations. Internal management interface 2913 is used to connect between storage control modules 2200 and storage management module 2900 via internal management network 2120. External management interface 2914 is used to connect between storage management module 2900 and management computer 1100 via management network 4200. Internal interface 2915 is used to connect between storage management module 2900 and storage internal bus or internal switched network 2133.

Cache memory 2130 temporarily stores write data received from the host computer 1000 before the data is stored into disk drives 2001. Cache memory 2130 also stores read data that is requested by the host computer 1000. Cache memory 2130 may be a battery backed-up non-volatile memory, and the amount of cache allotted to each storage control module 2200 can be configured based on the role of the particular storage control module or the load of the particular storage control module. For example, some storage control modules 2200 may require more cache than others, depending on how each storage control module is being used according to the invention.

Disk interfaces 2110 and 2111 are used to connect between storage controller 2100 and internal disk drives 2001, an external storage system 3000 which may be a conventional storage system and not necessarily another unified storage system 2000, or a tape device 5000. Thus, I/F 2111 may for example be connected to a network 4100, which may be a local area network, or which may be the same network as network 4000, and/or management network 4200. Further, storage controller 2100 may store data to external storage system 3000, tape device 5000, via a network connection instead of or in addition to storing data to disk drives 2001.

Each of the storage devices 2001 are disk drives, or other suitable storage devices, such as solid state memory, optical drives, tape drives, or the like. Storage devices 2001 process the I/O requests for storing and retrieving data in accordance with appropriate protocol commands such as SCSI commands. Moreover, the storage system 2000 does not necessarily have to have internal storage devices 2001, but instead may use external storage system 3000 or other external storage for storing and retrieving data. Accordingly, it should be apparent that other appropriate hardware architecture can be applied to the invention.

Figure 2:
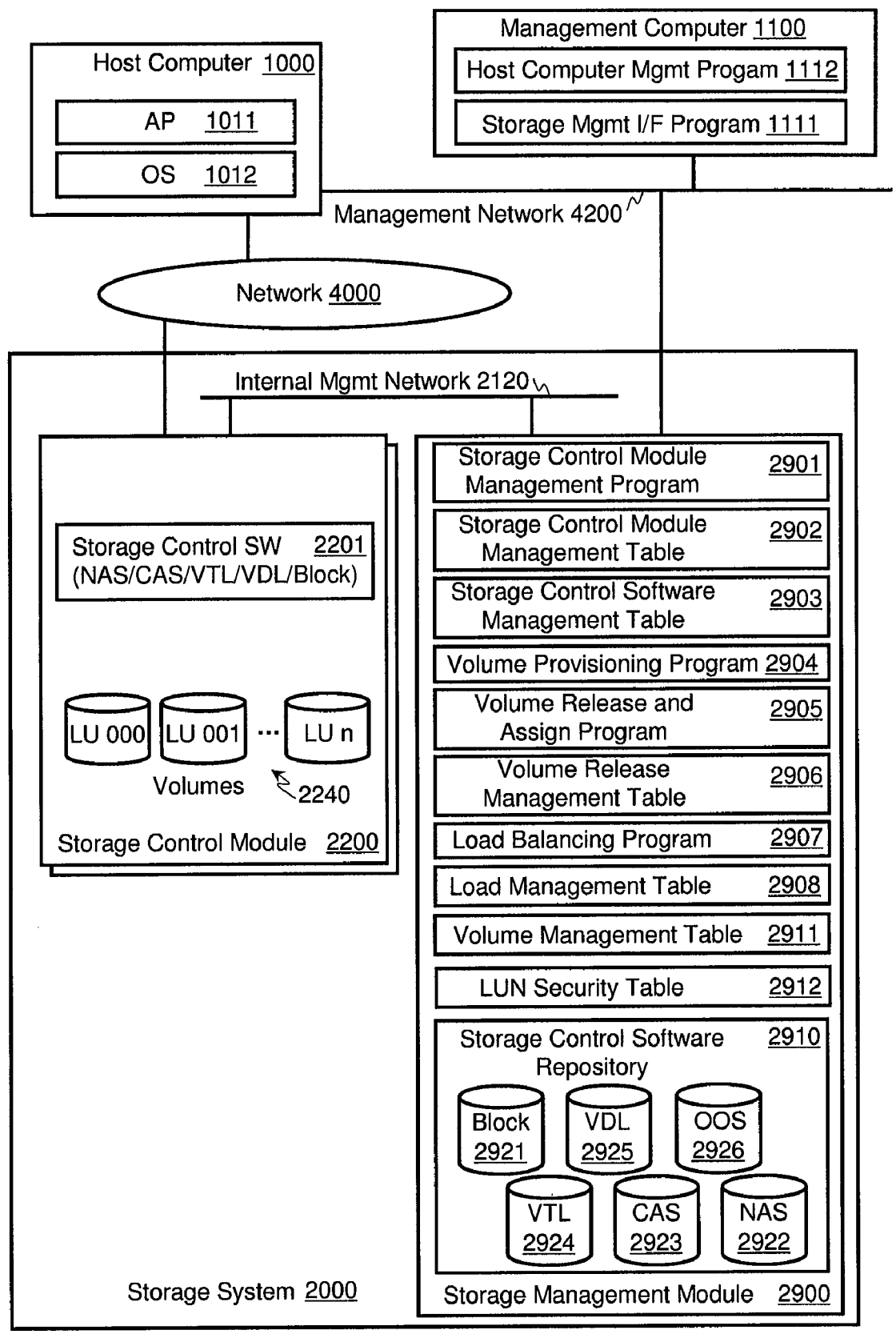
FIG. 2 illustrates an example of a logical configuration of the invention applied to the architecture of FIG. 1.

FIG. 2 illustrates an example of software configurations by which the method and apparatus of the invention may be applied. Host computer 1000 is a computer on which some application (AP) 1011 generates I/O operations such as for writing data to and reading data from storage system 2000. Host computer 1000 also includes an operating system (OS) 1000 that includes network drivers to enable connection between host computer 1000 and storage system 2000. Examples of network communication protocols that may be used under the invention include SCSI over FC/Ethernet, NFS/CIFS file operations over Ethernet, and/or HTTP over Ethernet. Thus, because the invention is a unified storage system, any number of communication protocols can be applicable to the invention.

Management computer 1100 includes a storage management I/F program 1111 that enables an administrator to issue operations such as system configuration setting operations for configuring storage system 2000. A host computer management program 1112 also resides on the management computer 1100 to enable an administrator to manage host computers 1000 that connect to the one or more storage systems 2000.

Storage control module 2200 includes storage control software (SW) 2201 that is installed and executed on storage control module 2200 in a manner to be described further below for causing storage control module to carry out particular storage operations and technologies. Examples of storage control software 2201 that might be installed on a storage control module of the invention include software for implementing block storage, NAS, CAS, Virtual Tape Library (VTL), Virtual Disk Library (VDL), and Object Oriented Storage (OOS). The typical operations of each type of storage control SW are described further below. Additionally, the type of storage control SW 2201 does not restrict the scope of the invention, since any type of storage control SW may be applicable to the invention.

Storage control module 2200 also includes one or more logical volumes 2240, having logical unit numbers (LUNs) such as "000" and "001", and so forth. Volumes 2240 are composed of one or more of disk drives 2001 which are depicted in FIG. 1, and are presented by the storage control SW 2201 for use by host computers 1000 in storing data. Moreover, RAID functionality or other typical storage system control functionalities provided by conventional storage systems can also be provided by the storage control SW 2201. For example, disk drives 2001 can be configured into array groups, and one or more logical volumes 2240 may be created on each array group.

Storage management module 2900 executes software for managing the storage system 2000. Under the invention, a number of storage management programs and management tables may be employed for carrying out the invention, each of which is described below.

A storage control module management program 2901 manages the storage control modules 2200. A typical management operation carried out by this program is to install a specific storage control software 2201 onto a particular storage control module 2200 to enable that storage control module to function in a desired manner.

A storage control module management table 2902 provides information for keeping track of which storage control software is installed on which storage management module. FIG. 3 illustrates an example of storage control module management table 2902. Storage control module management table 2902 may be stored on a memory of the storage management module 2900, or in a volume assigned for the use of the storage management module 2900. Storage control module management table contains information regarding the storage control software 2201 running on each storage control module 2200. Typical entries of storage control module management table 2902 include a storage control module identifier 29021, such as a value of a storage control module number; a type of currently assigned storage control software 29022, such as block, NAS, CAS, etc.; a vendor 29023 of the storage control software; a version 29024 of the storage control software; a volume number 29025 (e.g. Logical Unit Number) assigned to the storage control module; and a status 29026 of the storage control module. With regards to status 29026, "Online" may mean that the storage control module 2200 is currently being used or assigned, while "Offline" may mean that the storage control module is not currently assigned.

A storage control software management table 2903 contains information regarding the specific types and versions of storage control software available in the unified storage system 2000. FIG. 4 illustrates an example of storage control software management table 2903. Storage control software management table 2903 may be stored on memory 2917 of the storage management module 2900, or in a volume assigned to storage management module 2900. Storage control software management table 2903 contains information about storage control software able to be installed in storage control modules 2200 of storage system 2000. Typical entries of the storage control software management table 2903 include type of storage control software 29031; vendor 29032 of the storage control software; version 29033 of the storage control software; and volume number 29034 in which the storage control software is stored. The path to the particular volumes 29034 in which the storage control software is stored can be defined so as to enable the storage management module 2900 to access the volumes.

A volume provisioning program 2904 is a program whose typical management operation is to allocate volumes 2240 to the storage control modules 2200, and define paths in the system from a particular storage control module 2200 to a particular volume 2240 that is allocated (assigned) to that storage control module. FIG. 5 illustrates an example of a volume management table that is used by volume provisioning program 2904 to manage the volumes allocated in the storage system 2000. Typical entries of the volume management table are volume number 29111; assigned storage control module number 29112; and associated storage control module port WWN 29113 (abbreviated WWNs are illustrated in FIG. 5). FIG. 6 illustrates an example of an LUN security table 2912 that is used by volume provisioning program to control access to particular volumes 2240. Typical entries of the LUN security table 2912 include volume number 29121 and the WWN of the host computer 29122 that is permitted to access the volume (abbreviated WWNs are illustrated in FIG. 6).

A volume release and assign program 2905 is executable to release one or more volumes 2240 from a particular storage control module 2200 (i.e., delete a path definition), and is also able to define a path from a storage control module 2200 to a volume 2240.

FIG. 7A illustrates an example of a volume release management table 2906. The volume release management table

2906 may be stored on memory 2917 of the storage management module 2900, or in a volume assigned to storage management module 2900. Volume release management table 2906 contains information about released storage control software for each storage control module in order to keep the volume information of each storage control module when the storage control software is released (i.e., uninstalled) from the storage control module. Typical entries of volume release management table 2906 include release number 29061 which is issued by the volume release and assign program 2905 when the volume is released from a storage control module; a storage control module identifier 29062 such as a value of a storage control module number assigned within storage system 2000; a type of storage control software assigned 29063 that was released from the storage control module by the release; a vendor 29064 of the storage control software the was released; a version 29065 of the storage control software that was released; and one or more volume numbers 29066 (e.g., Logical Unit Numbers) assigned to the storage control module. FIG. 7B illustrates another example of volume release management table 2906'. In addition to the entries of volume release management table of FIG. 7A, the volume release management table 2906' of FIG. 7B contains a LUN security information 29067 for each volume. This enables the LUN security setting for each volume to also be preserved at the time of volume release.

Figure 8:
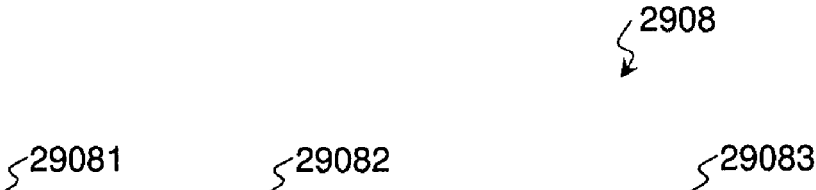
FIG. 8 illustrates an example of a load management table.

Load balancing program 2907 manages the computation load of computation of the storage system, and balances the load over the various modules of the storage system. A typical management operation carried out by load balancing program 2907 is to measure the load for each storage control module 2200, and then to execute a load balancing process, as will be discussed further below. FIG. 8 illustrates an example of a load management table 2908 that is used by load balancing program 2907. Load management table 2908 may be stored on memory 2917 of the storage management module 2900, or in a volume assigned to storage management module 2900. Information about the computational load for each storage control module 2200 is stored in load management table 2908. Typical entries of load management table 2908 include storage control module identifier 29081, such as a value of storage control module number assigned internally in the storage system; CPU utilization 29082 (listing both a current utilization and a threshold at which rebalancing should take place); and the number of host connections 29083 to the storage control module or to each port of the storage control module (listing both a current number of connections and a threshold number at which rebalancing should take place). Throughput of each port of the storage control module 2200 may be another entry in this table (not shown) for determining load on the storage control modules.

A storage control software repository 2910 is managed by storage management module 2900. An administrator installs storage control software into storage system through the storage management I/F program 1111 in the management computer 1100. When this occurs, the storage control software management table 2903 is updated by storage control module management program 2901. This may be performed automatically by the storage control management program 2901, or may be performed manually by the administrator via storage management I/F program 1111. The storage control software is stored into the storage control software repository managed by the storage control module 2900. The repository may be stored on memory 2917 of the storage management module 2900, or in a volume assigned to storage management module 2900.

Examples of storage control software that may be contained in the storage control software repository of the invention include the following:

Block storage control SW 2921 which is able to present allocated volumes 2240 to host computer 1000. Block storage control SW 2921 is able to receive and interpret network operations such as FC, and then process SCSI commands received from host computer 1000 for accessing allocated volumes 2240 directly according to block addresses.

NAS storage control SW 2922 is able to export file systems on allocated volumes 2240. File related operations from host computer 1000 delivered by network protocols such as NFS and CIFS are processed by NAS storage control SW 2922, and a network file system server module such as NFS/CIFS is included with NAS storage control SW 2922 and resides on storage control module 2200 when the NAS storage control SW 2922 is installed. Thus, the data is accessed as a file using file-based commands from a user or an application, rather than accessed as individual storage blocks of a standard allocation size, as in block-based access. The file-based commands are directed to the file system, and the file system typically interprets the file commands into block-based commands.

CAS storage control SW 2923 enables functionalities for storing data in an address based on the content of the data, rather than at an arbitrary storage location. Under some CAS systems, the system determines an address for particular data based upon the actual content of the data, such as through a hash calculation. In other CAS systems, the file path name can be used instead of a hash calculation and other CAS functionalities may be incorporated, such as the ability to add user defined metadata, the ability to lock an object using object lock, the ability to add an integrity check, and the like, as is known in the art.

VTL storage control SW 2924 provides VTL functionalities such as tape command reception and data de-duplication by using disk devices to emulate tape devices.

VDL storage control SW 2925 uses tape drives to emulate disk devices, and is able to provide logical volumes composed of tape drives, rather than hard disk drives.

OOS storage control SW 2926 is able to carry out storage of data as objects comprised of the data and the attributes of the data (metadata) according to object-based protocol commands, such as those used in the OSD T-10 standard.

Static Storage Control Software Allocation and Release

In this section, the procedures of installing storage control software to a storage control module, uninstalling the storage control software from a storage control module, and re-installing the storage control software to the storage control module are described. Before the storage system of the present invention, since the storage control software are fixed and associated with each storage control module, the above procedures were not generally required.

Figure 9A:
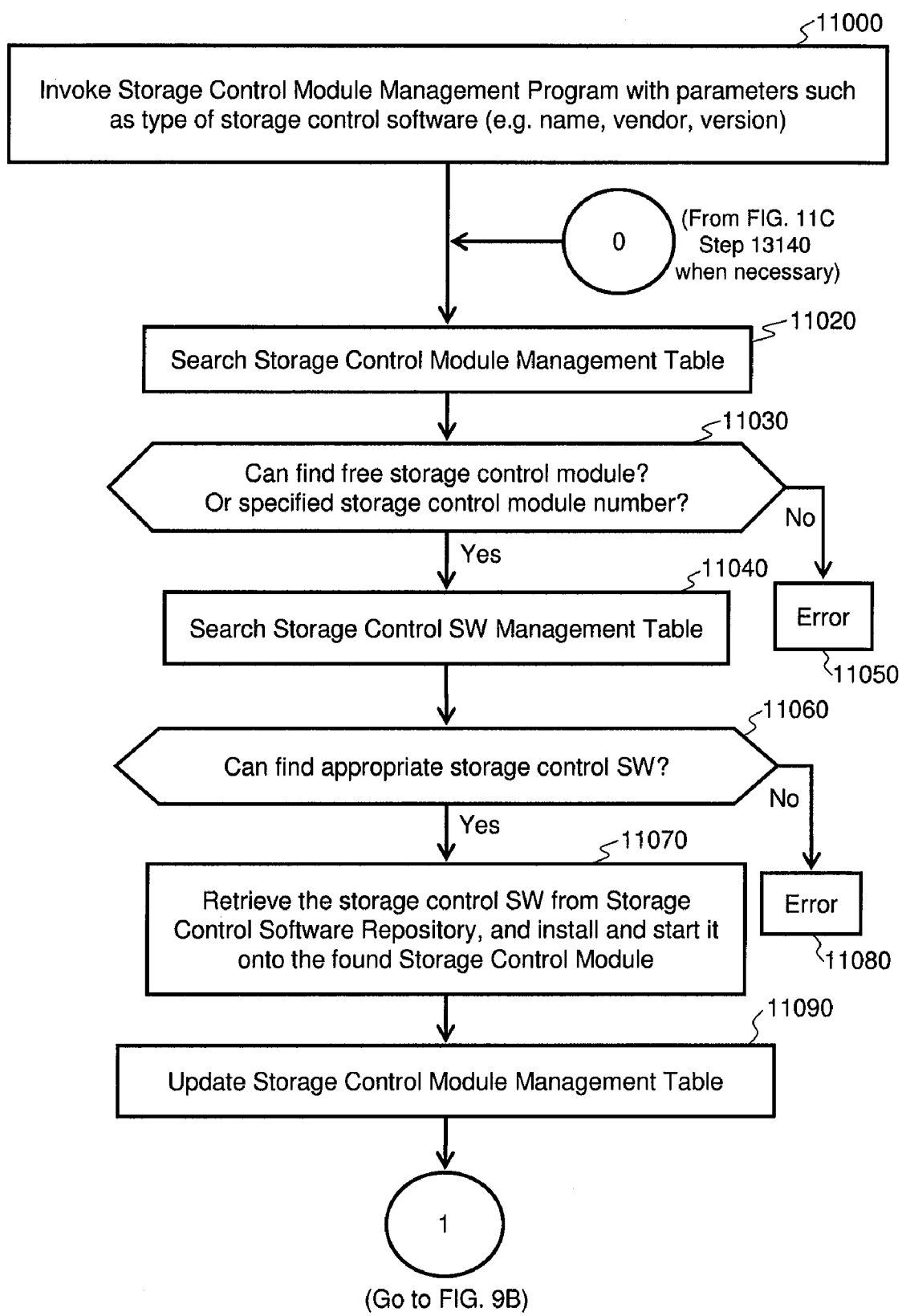
FIGS. 9A-9C illustrate an exemplary control procedure to allocate a free storage control module.
Figure 9B:
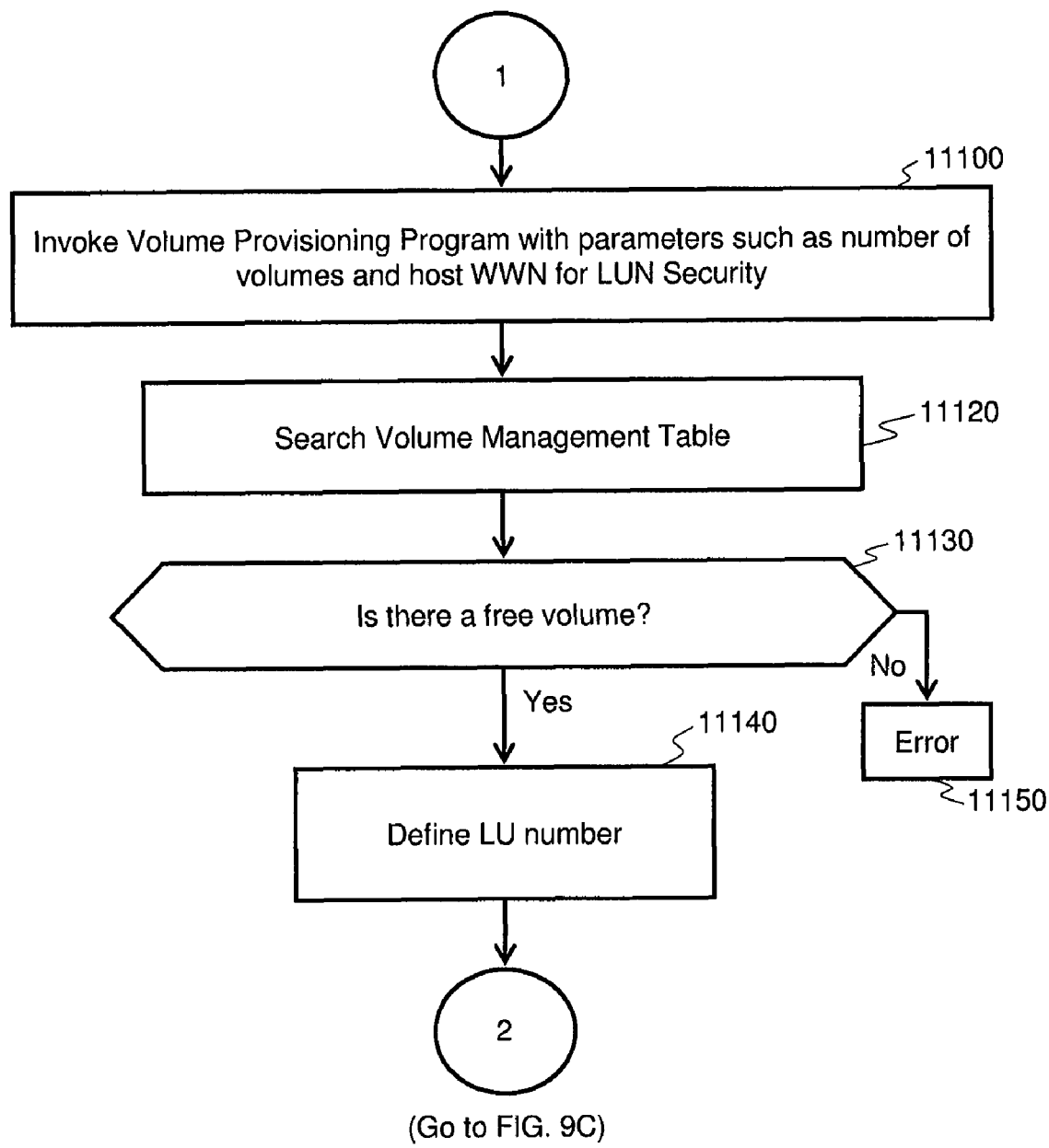
Figure 9C:
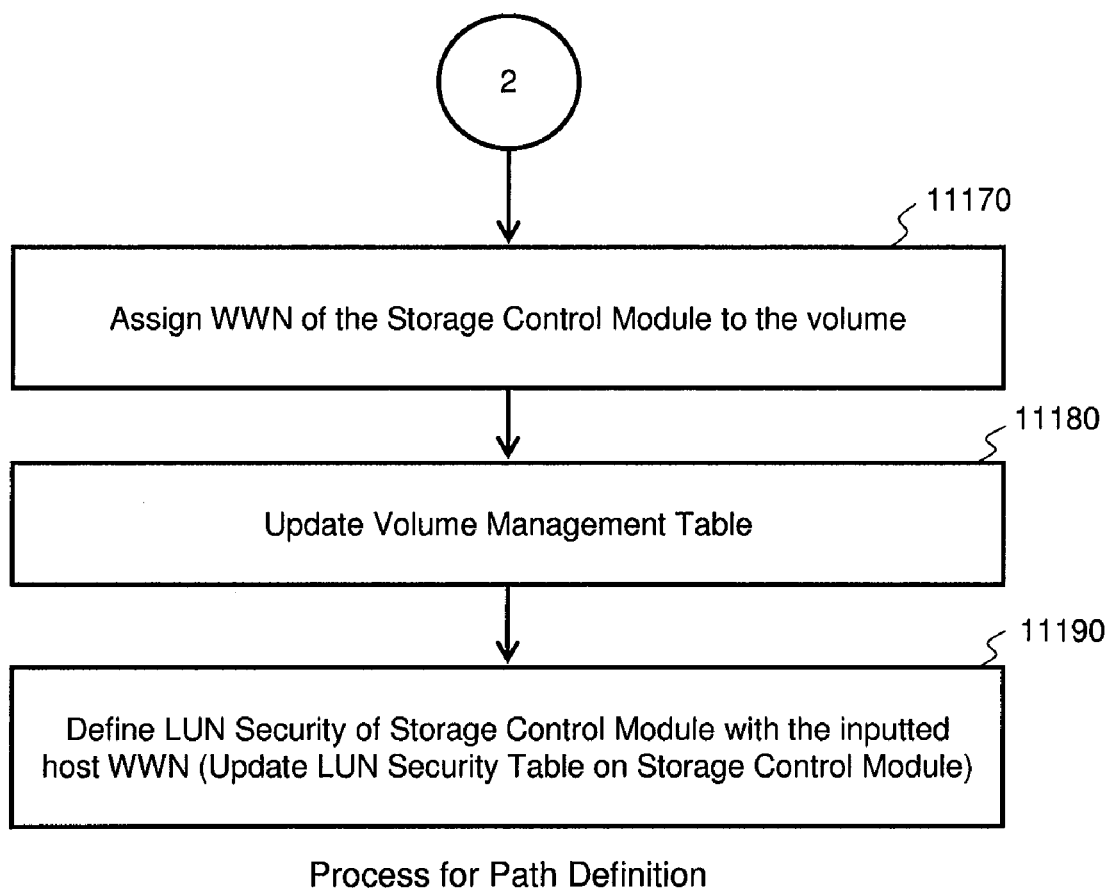

An exemplary control procedure for installation of storage control software 2201 into a storage control module 2209 is illustrated in FIGS. 9A-9C. The procedure provides for initial allocation of an available storage control module, which includes finding a free storage control module 2200, installing storage control software 2201 into the storage control module 2200, and allocating empty volumes to the storage control module. The procedure is usually used at the installation of a new storage system or when a new storage control module is provided.

FIG. 9A illustrates the procedure for locating a free storage control module and for installing storage control software into the located storage control module.

At Step 11000, an administrator uses storage management I/F program 1111 on management computer 1100 to invoke storage control module management program 2901 on the storage management module 2900. The administrator provides parameters such as type of storage control software (mandatory), vendor (optional), version (optional), etc., so that the storage control module management program 2901 will allocate a free storage control module with the specified storage control software.

At Step 11020, the storage control module management program searches storage control module management table 2902 in order to find a free storage control module whose status column 29026 of storage control module management table is "offline". If the administrator specifies a particular number for a storage control module at step 11000 because the administrator already knows which storage control module is available by looking at the storage control module management table via storage management I/F program 1111, then this step can be skipped.

At Step 11030, when a free storage control module cannot be found, or if the storage control module number specified by the administrator is incorrect, the process goes to Step 11050 to return an error and end the program. Otherwise, the process goes to step 11040.

At Step 11040, When a free storage control module is found at step 11020 or the free storage control module is specified, the storage control module management program 2901 searches storage control SW management table 2903 in order to check if the specified storage control software has already been installed into the storage system 2000. When the storage control module management program checks storage control SW management table 2903, it has to compare the type of storage control software, and the other parameters for comparison, such as vendor name or version of storage control software can be an optional.

At Step 11060, when the specified storage control software has already been installed into the storage system 2000, the process goes to step 11070. However, when the specified storage control software has not yet been installed into the storage system 2000, the storage control module management program 2901 goes to step 11080 to return an error and end the process.

At Step 11070, the storage control module management program 2901 retrieves the specified storage control SW from the storage control software repository 2910, installs the retrieved storage SW into the memory of the free storage control module found at Step 11020, and then starts the storage control software on the free storage control module.

In an alternative method to install and start the storage control software in the free storage control module, when the volume that contains the specified storage control software can be shared among the storage management module and the storage control modules, the storage control module management program defines a path to the shared volume that contains the specified storage control software. The storage control module management program 2901 then assigns as "LU0" for the volume at the free storage control module, so that the storage control module boots from this volume. Further, if the volume that contains the specified storage control software cannot be shared, the specified storage control software may be copied to another volume assigned to the free storage control module as "LU0". Then, when the storage control module starts, the program loader program, which may be located in BIOS, reads the specified storage control software from a specific LU such as "LU0" during the boot up process, and starts running the software on the memory.

At Step 11090, after the storage control software has been installed for use by the free storage control module, the storage control module management program 2901 updates the entry for the particular storage control module in the storage control module management table 2902 with the information of the specified storage control software.

Thus, the present invention offers an advantage over the prior art of enabling different storage control softwares to be installed into storage control modules when specified so that the storage control modules may be adapted for a desired use. Before this invention, only the pre-installed storage control software was started at each storage control module, and there was no choice for changing the storage control software that was executed at startup.

After finishing the installation of storage control software onto the storage control module, an empty volume is allocated to the storage control module, as illustrated in FIG. 9B.

At Step 11100, an administrator uses storage management I/F program on the management computer to invoke volume provisioning program 2904 on the storage management module 2900 using parameters such as the number of volumes to create and host WWN to use for setting the LUN security. Alternatively, the administrator may manually search for and specify an unallocated volume.

At Step 11120, the volume provisioning program 2904 searches volume management table 2911 in order to find an empty (unallocated) volume.

At Step 11130, when an unallocated volume is found or a volume is specified by the administrator at step 11100, the volume provisioning program goes to step 11140. However, when an unallocated volume is not found, or if the administrator specifies an incorrect volume, the process goes to step 11150 where the volume provisioning program returns an error and ends the program.

At Step 11140, volume provisioning program 2904 defines a logical unit number for use in identifying the volume, and the process proceeds to the Path Definition process set forth in FIG. 9C for defining the path for the volume.

At Step 11170 of FIG. 9C, the volume provisioning program 2904 assigns a port WWN of the storage control module located in step 11020 to the newly allocated volume.

At Step 11180, the volume provisioning program 2904 updates the volume management table 2911 with the new volume information.

At Step 11190, the volume provisioning program 2904 defines LUN security to the volume using the inputted host WWN, which means the volume provisioning program 2904 updates LUN security table 2912 on the storage control module. After completing the above procedure, a host computer 1000 will be able to access the assigned volume through a specified port of the storage control module.

Release of Storage Control SW from a Storage Control Module

An administrator might want to switch the role of one or more storage control modules 2200 in order to utilize the computation power of the storage control modules more efficiently. For instance, more computation power is sometimes needed for conducting backup operations at night time. In such a situation, it is desirable that there should be more storage control modules running VTL storage control software at that time. Likewise, there might be less need for storage control modules to be running block-based storage control software or NAS storage control software at this time, because those are usually used by the production applications which may be more active during the day time.

To realize role changes for the storage control modules 2200, a procedure for releasing storage control software from the storage control module is provided under the invention. Moreover, the data and configuration information such as host connections of the original storage control module configuration would preferably be preserved so that the prior roles may be resumed at a later time, if desired. For example, an administrator might like to restore the storage control module back to the original configuration the next morning after the backup procedure has been carried out.

Figure 10:
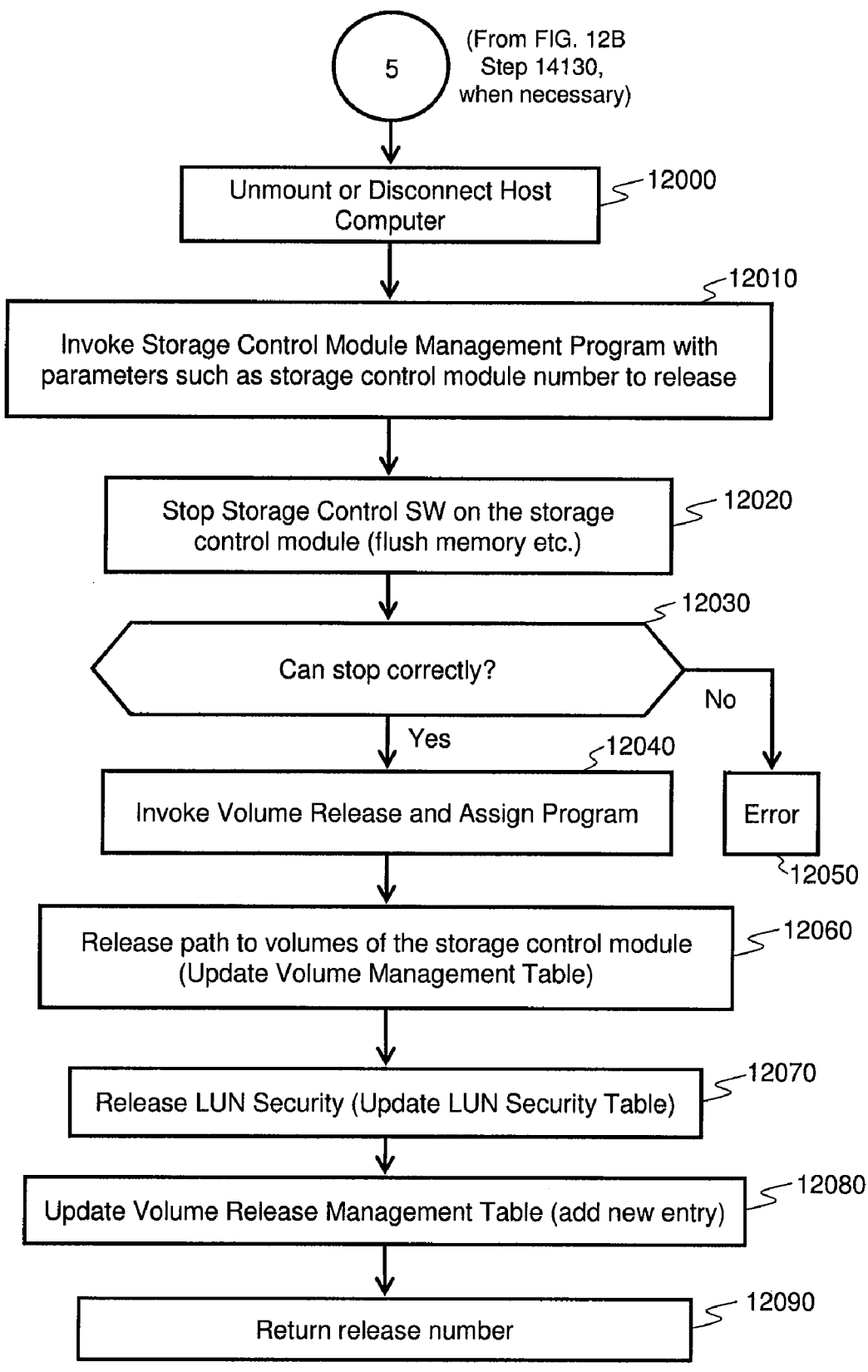
FIG. 10 illustrates an exemplary process to release storage control software from the storage control module.

FIG. 10 illustrates an example of a control procedure to release the storage control software 2201 from a storage control module 2200, which includes disconnection of the host computer, stoppage of the storage control software, releasing of the volumes assigned to the storage control module, and storing information relating to the volume.

At Step 12000, an administrator invokes host computer management program 1112 on management computer 1100 to disconnect the host computers 1000 from the particular storage control module 2200 that is to be released (i.e., reassigned). The disconnection command may be an instruction to "unmount from the file system provided by the storage control module" or "shutdown the host computer OS". To facilitate the instruction, the information regarding the host computer connection with the storage control module may be maintained and managed by the management computer 1100. An example of such connection information is a copy of volume management table 2911 and LUN security table 2912.

At Step 12010, an administrator, via storage management I/F program 1111 on management computer 1100, invokes storage control module management program 2901 on storage management module 2900. The administrator includes parameters such as the number of the storage control module to be released in order to release a specified storage control module.

At Step 12020, the storage control module management program 2901 stops the storage control software 2201 on the specified storage control module 2200, and performs any necessary procedures, such as flushing the cache memory to disk.

At Step 12030, if the stop operation is able to be completed without an error, the process goes to step 12040. On the other hand, if the stop operations complete with an error, then at step 12050 the storage control module management program 2901 returns an error and the program stops.

At Step 12040, storage control module management program 2901 invokes the volume release and assign program 2905 on storage management module 2900 in order to release the data volumes and preserve the configuration information, such as current host connections to the volumes and the like. However, the preservation of configuration might not be mandatory in all cases. For example, if there is no intention of ever resuming the current configuration then there is no need to retain the configuration information. Further, if the information is not preserved, an administrator could remember the information and redefine paths from host computer to the volumes during the reallocation of the storage control module.

At Step 12060, the volume release and assign program releases paths to volumes of the storage control module. Typical release operations are to update the volume management table of FIG. 5, such as by deleting the value of "Assigned Storage Control Module Number" entry 29112 and "Associated Storage Control Module WWN" entry 29113 for the particular volume. Although the volume management information is deleted, the data itself is still retained in the storage system since the volume itself has not been deleted. Thus, the data can be utilized at the reallocation of the volumes, and then it is not necessary to backup the data for use in carrying out the reallocation.

At Step 12070, the volume release and assign program releases LUN security for the released volume(s). A typical release operation might be to update the LUN security table 2912 of FIG. 6, such as by deleting the value for "WWN of Host that is Permitted Access" entry 29122. Further, this step is not necessarily mandatory. Since the LUN security table 2912 is managed by the storage control module itself, the LUN security information might be reused at upon reallocation of the released volume(s). For example, if the same volume(s) are reallocated to the same storage control module at a later time, then the LUN security settings will still be valid. However, it is not necessary for the released volume(s) to be reallocated to the same storage control module at the time of reallocation, which means another storage control module might be assigned to these volume(s) at the time of the reallocation. In such a case, it is better to release the LUN security information at the time of volume release, and then redefine the LUN security information at the time of reallocation of the volume(s). To help the administrator redefine the LUN security information, the LUN security information can be preserved in the volume release management table such as is illustrated at FIG. 7B in the next step 12080. In alternative method, the management computer could preserve the LUN security information. Still alternatively, the administrator may remember the information, in case the information is utilized at the time of reallocation.

At Step 12080, the volume release and assign program 2905 generates a release number and updates volume release management table 2906 (i.e., adds new entry for the new release number). As discussed above, the LUN security information 29067 may be included in the release management table 2906' of FIG. 7B.

At Step 12090, the volume release and assign program returns the release number to the management computer 1100. The returned release number will be utilized at the reallocation of the volumes which means at the relocation of either the same storage control module or of a different storage control module. The release number may be maintained by storage management interface program 1111 on the management computer 1100, or may be maintained manually by the administrator. After completing the above procedure, the specified storage control module 2200 is free, and can be assigned a new role (i.e., new storage control software may be loaded onto the specified storage control module 2200). Other situations in which the release operation is used is for the replacement of a storage control module or the deletion of a storage control module.

Re-Installing Storage Control SW into a Storage Control Module

As discussed above, an administrator might want to restore the storage control module which was released in the previous procedure back to the original configuration (e.g., such as in the morning or during the replacement of the storage control module). The procedure is different from that set forth in FIG. 9A for installing storage control software to a storage control module. As will be described below, in this situation the preserved volumes are assigned to the allocated storage control module.

Figure 11A:
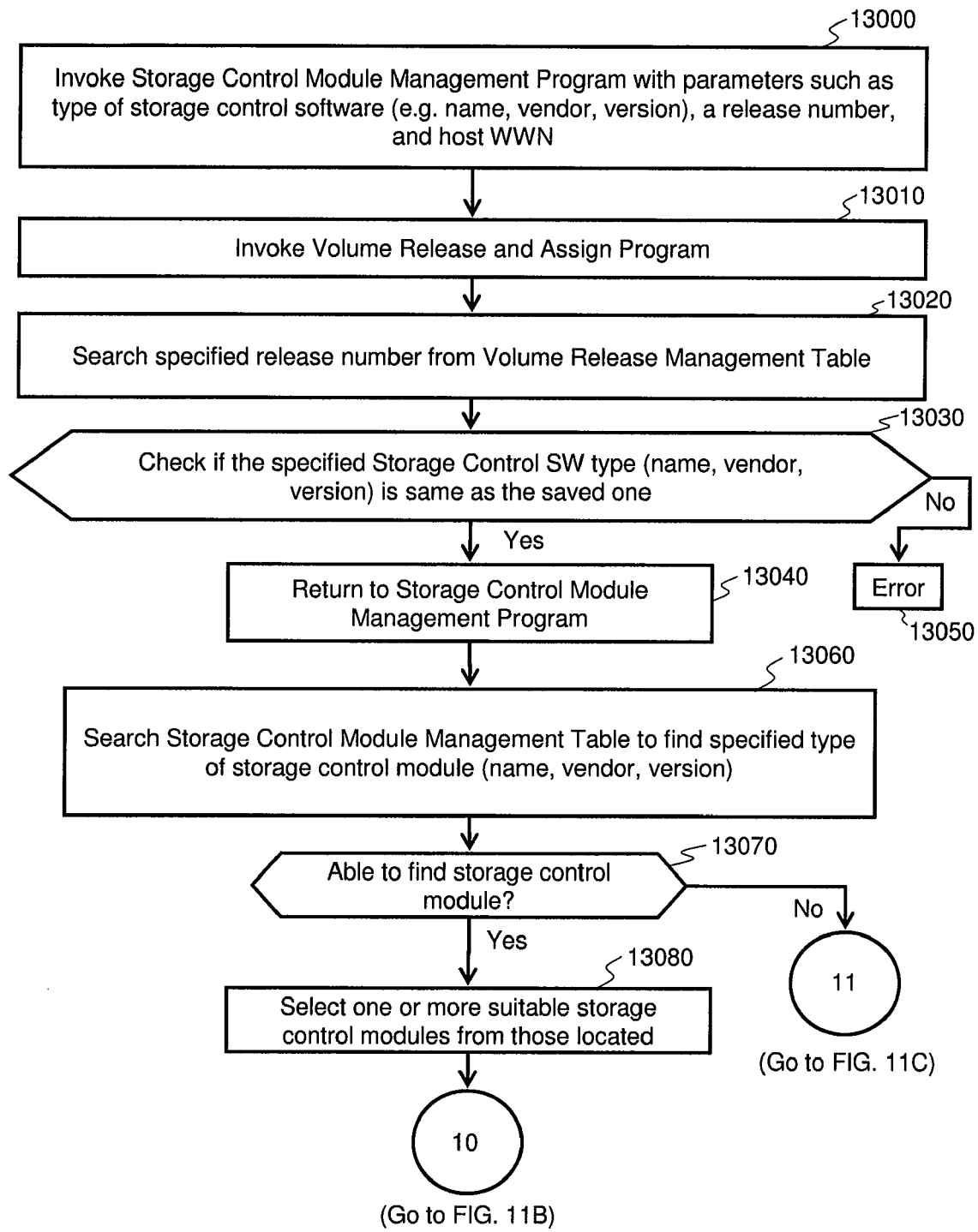
FIG. 11A-11C illustrate an example of a control procedure to reassign storage control software to a storage control module.
Figure 11B:
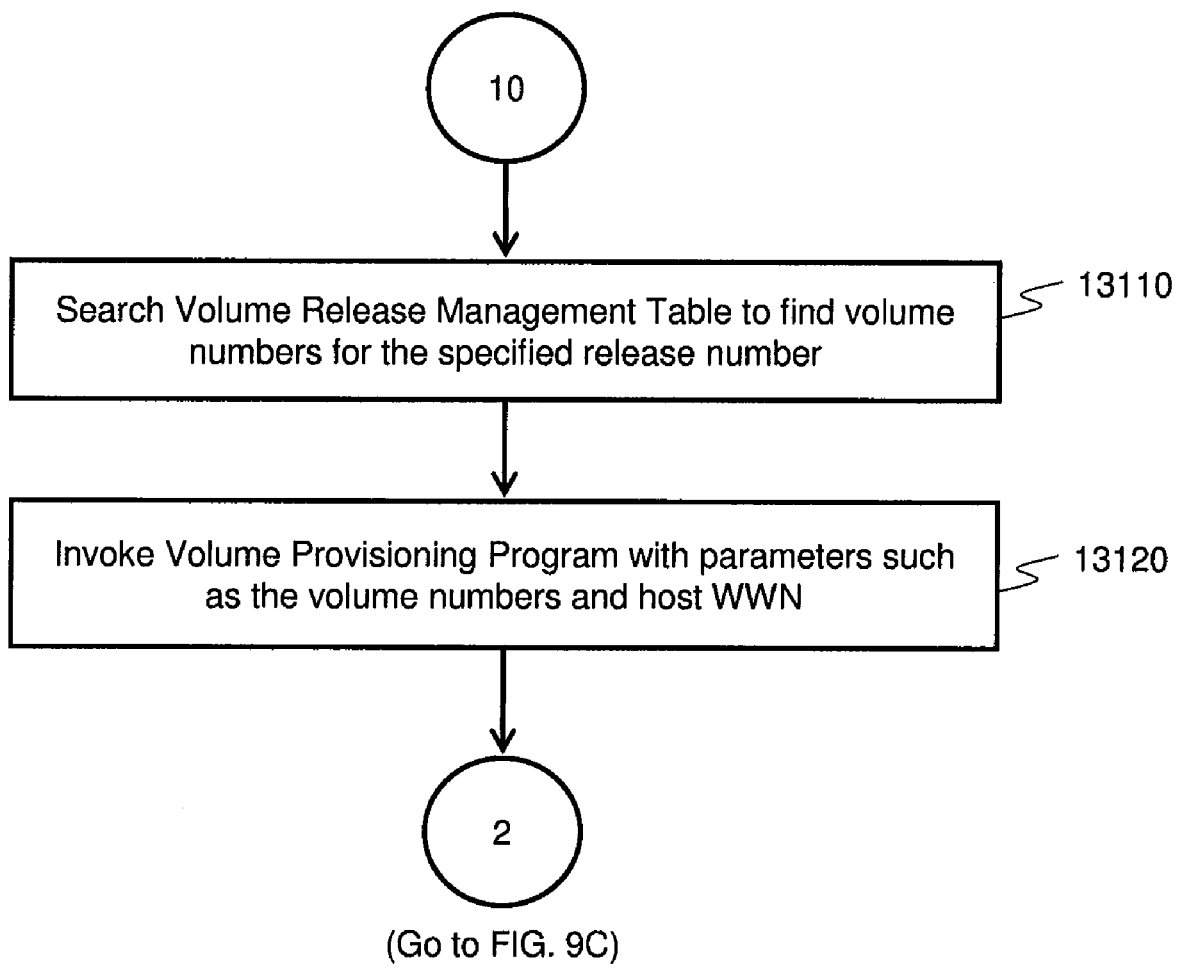
Figure 11C:
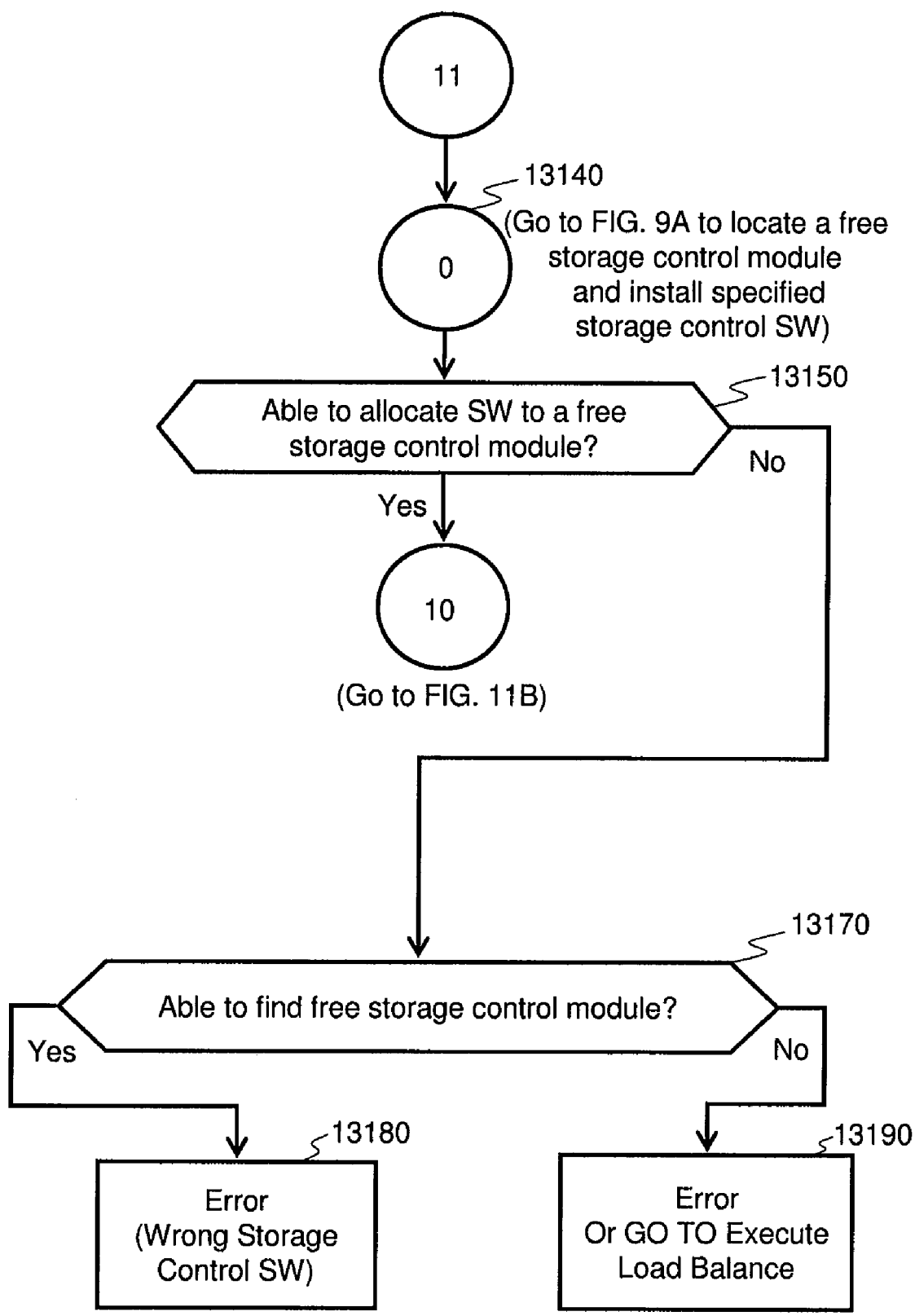

FIGS. 11A-11C illustrate an example of a control procedure to reassign storage control software 2201 to a storage control module 2200 (which might be the same storage control module as at the time of release, or a different storage control module). In general, the process includes retrieving the released storage control software information, locating an available storage control module, installing the storage control software, if necessary, reassigning any preserved volumes, and/or assigning new volumes, if necessary.

At Step 13000, an administrator invokes storage control module management program 2901 on storage management module 2900 via storage management I/F program 1111 on management computer 1100. The administrator uses parameters such as type of storage control software (mandatory), vendor (optional), version (optional), a specified release number, and a host WWN in order to reassign storage control software 2201 to a storage control module 2200.

At Step 13010, the storage control module management program 2900 invokes the volume release and assign program 2905 on storage management module 2900 in order to check whether the specified release number exists in the volume release management table 2906.

At Step 13020, the volume release and assign program searches for the specified release number in the volume release management table 2906.

At Step 13030, if the specified release number exists, the volume release and assign program 2905 checks whether the specified storage control software type is the same as the saved one in the volume release management table. The type of storage control software must be compared to ensure proper function, and the other comparisons such as vendor name or version of storage control software can be optionally compared. If the release number does not exist, or if the type of control software does not match that specified, then at step 13050 the volume release and assign program returns an error and stops the program. Otherwise the process goes to step 13040.

At Step 13040, when the specified storage control software is the same, the volume release and assign program 2905 returns the control of the process to the storage control module management program 2901. When it comes to either vendor or version difference (type of storage control software has to be the same), if the data format conversion program could be implemented in the storage system or can be utilized at the external server, it is not necessary to return an error, and operations can continue with data format conversion from the original version of the storage control software to the new version of the storage control software.

At Step 13060, after finding an appropriate entry for the released storage control module in the volume release management table 2906, a storage control module to which the new role will be assigned needs to be found, so that preserved original volumes can be reassigned to the storage control module. Thus, the storage control module management program 2901 searches the storage control module management table 2902 to determine if there is a storage control module 2200 that is already running the specified type of storage control software. When searching for a storage control module that already has the specified type of storage control software, the type of storage control software has to be compared, and the other parameters, such as vendor name or version of storage control software can optionally also be compared.

At Step 13070, if no storage control modules are located, or if the administrator would like to allocate a new storage control module in order to avoid increasing the computational load on existing control modules, the process goes to step 13140 of the process set forth in FIG. 11C. Alternatively, if one or more storage control modules are found that already have the specified storage control software installed, then at step 13080, the storage control module management program picks one of the located storage control modules. There are various ways of selecting one of the storage control modules. One method is to select the storage control module having the lowest computational load from among the candidate storage control modules, thereby simultaneously taking load balancing into consideration. However, the invention is not restricted to any particular method of selection. Moreover, the storage control module which takes over control of the volumes does not necessarily have to be a single storage control module, which means that multiple storage control modules could be assigned to take over control of the volumes in order to distribute the computational load across multiple storage control modules in a situation in which if just one storage control module were to take over the volumes, the storage control module might have overloaded. There are various ways of volume distribution across multiple storage control modules, and accordingly, the volume distribution methods do not restrict the invention. However, even if appropriate storage control modules are found in step 13140, the administrator might not want to use a particular storage control module if such use will cause the storage control module to be overloaded. In this case, the storage control module management program 2901 might provide an option for the administrator to take control of the flow at step 13080. After one or more storage control modules are selected, the process goes to step 13110 in the process of FIG. 11B.

At Step 13110, the storage control module management program searches the volume release management table 2906 to find volume numbers for the specified release number.

At Step 13120, the selected storage control module invokes volume provisioning program 2904 with parameters such as the volume numbers and host WWN which are obtained from the entry of volume release management table 2906' located in step 13110 (host WWN is obtained from the LUN security entry 29067). The process then goes to the process of FIG. 9C for defining the path for the one or more volume numbers located in step 13110.

At Step 11170, the volume provisioning program assigns a port WWN of the storage control module to the one or more volumes located in step 13110.

At Step 11180, the volume provisioning program updates the volume management table for the one or more volumes.

At Step 11190, the volume provisioning program defines LUN security for the one or more volumes using the inputted host WWN, which means that the volume provisioning program updates LUN security table 2912 on the storage control module. If the host WWN information is not preserved in the volume release management table such as FIG. 7A, the administrator could specify the host WWN information via storage management I/F program 1111 on management computer 1100. After completing the above procedure, a host computer is again able to access the assigned volume(s) through a specified port of the storage control module.

Returning to FIG. 11C, at Step 13140, if no storage control modules were located in the process of FIG. 11A, the process goes to the process of FIG. 9A, starting at step 11020 to attempt to locate a free storage control module and install storage control software into the storage control module. The process executes steps 11020-11090 and then returns to step 13150 in FIG. 11C. Steps 11020-11090 executed here are the same as described above with reference to FIG. 9A. Accordingly, the description of these steps does not need to be repeated.

After the storage control module management program 2901 installs and starts the specified storage control software in the storage control module, and updates the entry for the storage control module in the storage control module management table 2902 with the information of the new storage control software a step 11090, the process returns to step 13150 of FIG. 11C. If the process was unable to locate a storage control module or if the specified storage control software has not been installed into the storage system yet, the storage control module management program returns an error at steps 11050 or 11080, respectively.

At Step 13150, if a free storage control module was able to be allocated with the specified storage control software, then the process goes to step 13110 of FIG. 11B to find any volumes corresponding to the specified release number. Thus, the process carries out steps 13110, 13120 of FIG. 11B in the manner described above with reference to that figure, and then the process goes to the process of FIG. 9C to execute steps 11170-11190 to carry out path definition for the volume(s) corresponding to the specified release number. Because all these steps are described in detail above, the description does not need to be repeated here. After completing the above procedure, a host computer will again be able to access the assigned volume(s) through a specified port of the storage control module.

Returning to FIG. 11C, at step 13170, if a free storage control module cannot be allocated due to a mismatch of storage control software type at step 11080 of FIG. 9A, but a free storage control module was able to be located, then at step 13180 the storage control module management program returns an error that the wrong storage control software was specified, and ends the program. However, if a free storage control module cannot be allocated because there are no free storage control modules available at the step 11050 of FIG. 9A, then at step 13190, the storage control module management program returns an error that no storage control modules are free and ends the program. Alternatively, instead of ending the process, the Load Balancing Program 2907 may be invoked to attempt to release a storage control module, and then assign the role (i.e., the specified storage control software) to the released storage control module. The procedure for the load balancing program 2907 is set forth in FIGS. 12A-12C, and described in the following section.

Additionally, if empty volumes are needed in addition to the original volumes reassigned to the storage control module, an administrator may allocate one or more empty volumes to the storage control module. The procedure for carrying this out is the same as was described above of starting from step 11100 of FIG. 9B and continuing through step 11190 of FIG. 9C. Accordingly, these steps do not need to be described again here.

Dynamic Storage Control SW Allocation and Release

In the previous sections, an administrator specifies the allocation, release, and reallocation of a role to a storage control module in order to accomplish a role change depending on the time day, storage control module replacement, or the addition of storage control module. However, the invention provides that the storage system itself is able to reconfigure the roles of the storage control module to carry out load balancing automatically. For example, if a certain number of storage control modules are currently assigned for block-based processing, and a certain number are assigned for use as NAS processing, and the block-based storage control modules are overloaded while the NAS storage control modules have low activity, dynamic load balancing may be in order. Under the load balancing method of the invention, if there are no free storage control modules, one of the NAS storage control modules may be released and the volumes associated therewith assigned to another NAS storage control module. The released NAS storage control module may then have storage control SW for block-base processing installed to relieve the load on the other block-based storage control modules. Thus, the invention enables the storage control modules to be dynamically reallocated to various different types of storage control uses, with the foregoing being only a non-limiting example.

Figure 12A:
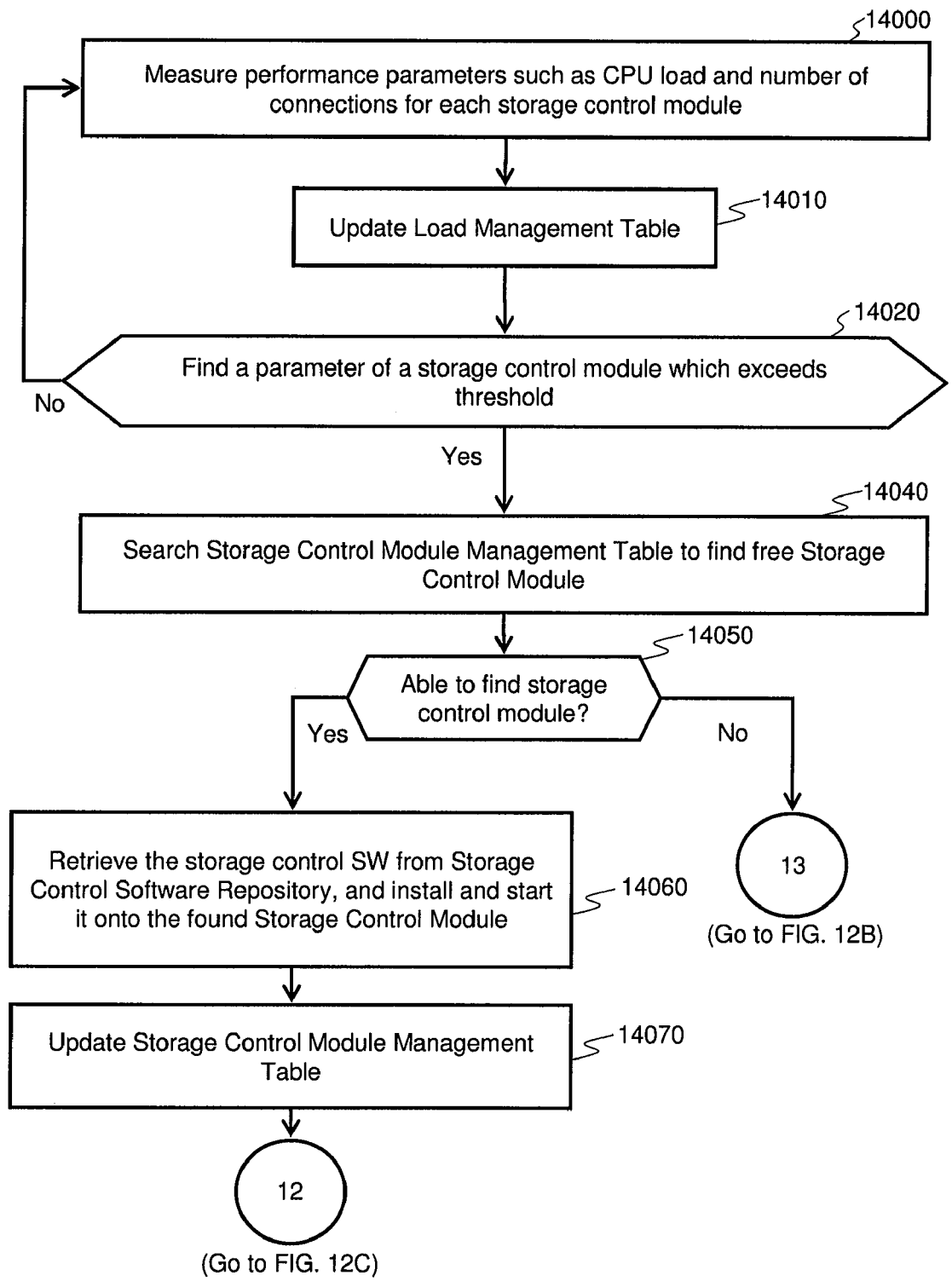
FIG. 12A-12C illustrate an example of a control procedure for load balancing.
Figure 12B:
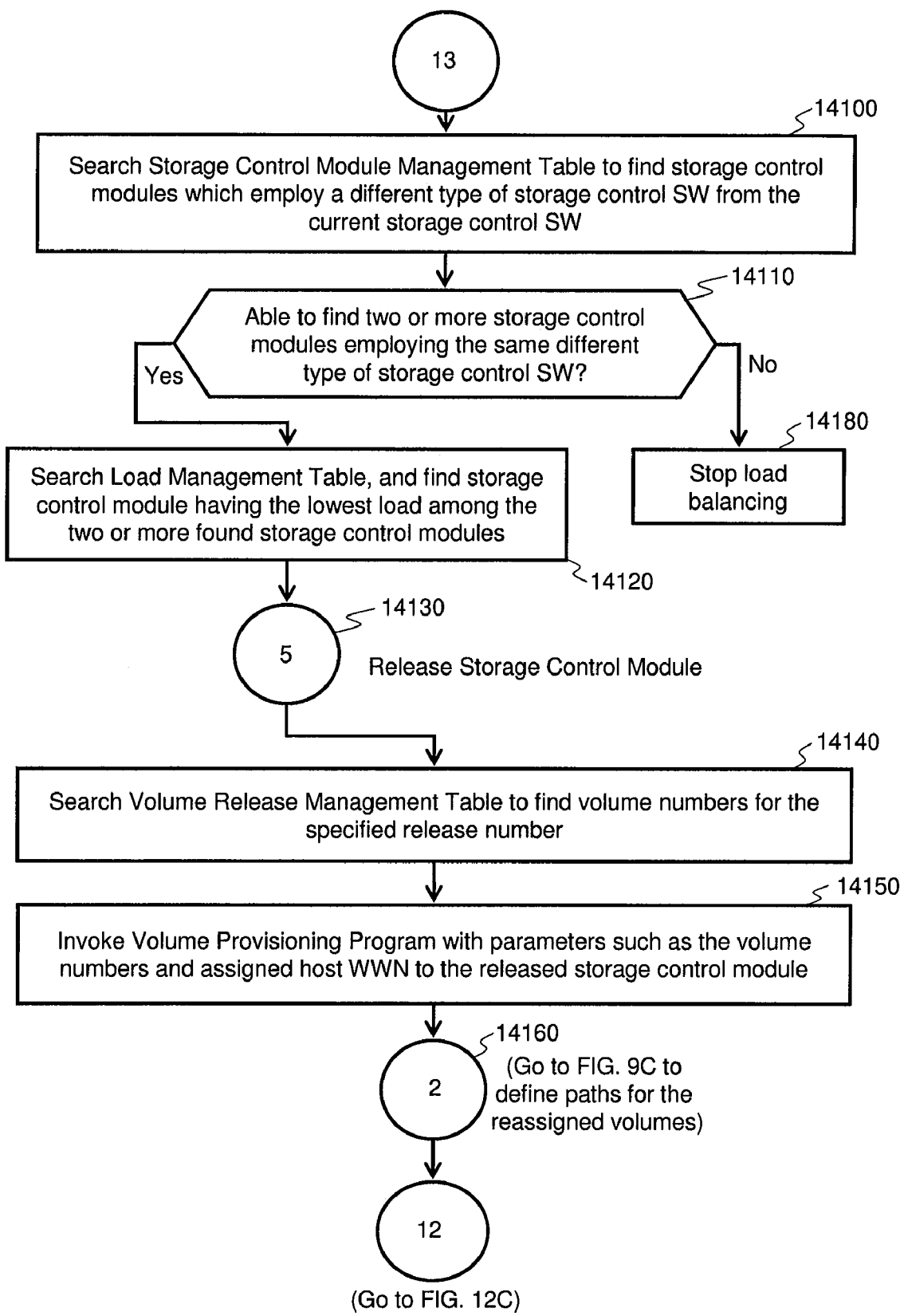
Figure 12C:
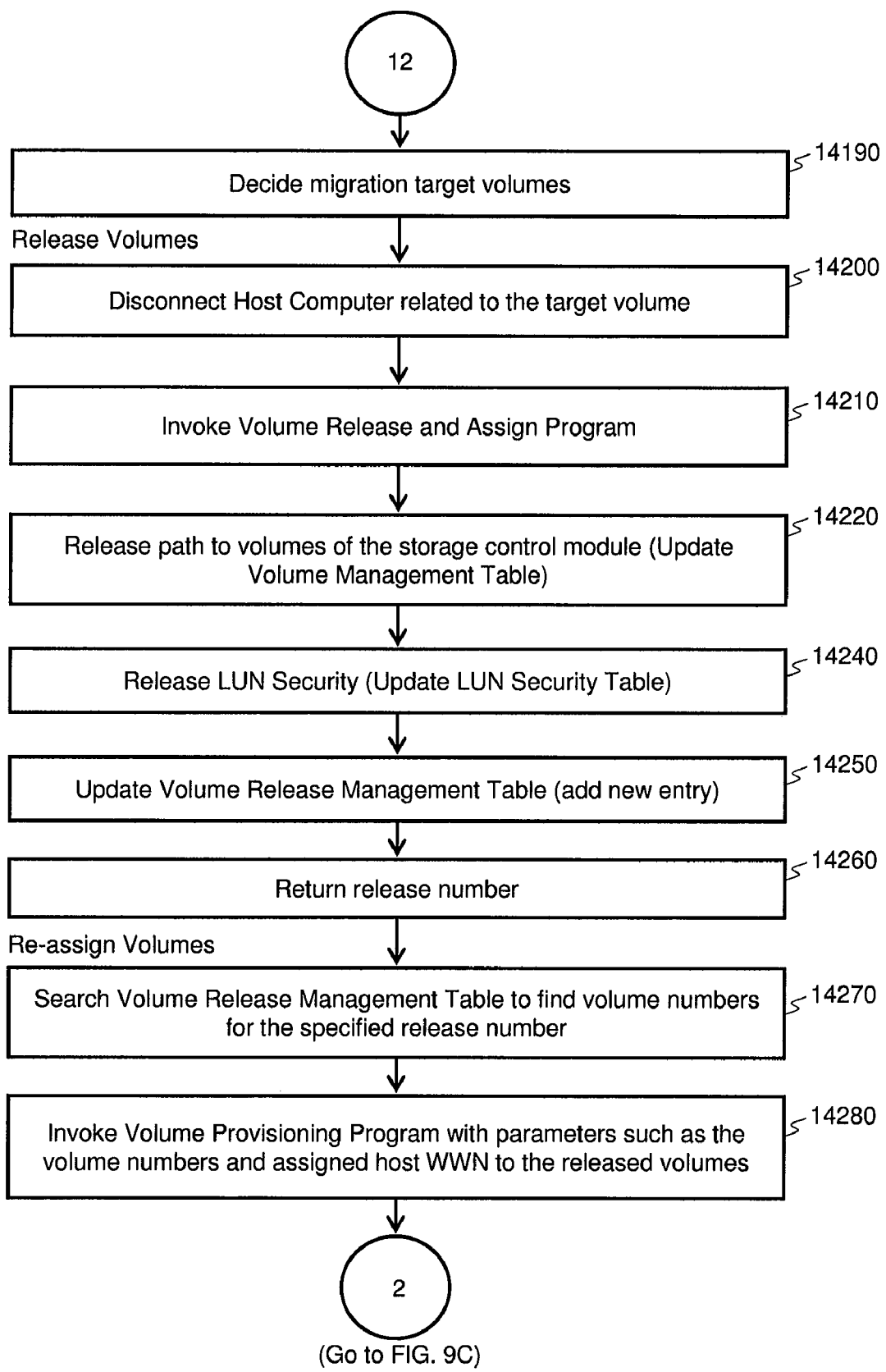

FIGS. 12A-12C illustrate an exemplary control procedure for carrying out load balancing according to the invention. The procedure generally includes measuring the loads on the storage control modules; finding, releasing and reallocating a migration target storage control module; finding migration target volumes; and executing the migration.

At Step 14000, the load balancing program 2907 on storage management module 2900 measures performance parameters for the storage control modules, such as CPU load, number of connections, and port throughput for each storage control module. The measurement may be performed periodically or on demand.

At Step 14010, the load balancing program 2907 stores the results of the measurement step into the load management table 2908 of FIG. 8.

At Step 14020, the load balancing program examines the load management table 2908, and when some parameter of a storage control module is located that exceeds a predetermined threshold at some point or in some duration, the load balancing process is executed by going to step 14040. Otherwise, the load balancing program keeps measuring the performance on a periodic or on-demand basis, as indicated by the loop back to step 14000. As for the load balancing process, the load balancing program distributes the load (e.g., I/O operations performed to volumes in the storage system) of a storage control module that was identified as passing a particular load or performance threshold.

At Step 14040, a storage control module has been identified to have a load that exceeds the predetermined threshold, so the load balancing program will attempt to relieve the load on the identified storage control module. Initially, the load balancing program searches the storage control module management table 2902 to find a free storage control module.

At Step 14050, if a free storage control module is located, the process goes to step 14060. However, if there are no free storage control modules, the process goes to step 14100 of FIG. 12B.

At Step 14060, the storage control module management program 2901 retrieves from the storage control software repository 2910 the storage control software 2201 which is of the same type as that running on the identified storage control module that exceeds the predetermined load threshold. The storage control module management program 2901 installs and starts the retrieved storage control SW 2201 onto the newly found storage control module that was located in step 14040. The procedure carried out in this step is similar to that described above in step 11070 of FIG. 9A.

At Step 14070, the load balancing program updates the storage control module management table 2902. This step is similar to the step 11090 of FIG. 9A. The process then goes to step 14190 of FIG. 12C to reassign volumes from the overloaded storage control module management table. The steps of FIG. 12C are set forth below following the description of FIG. 12B.

At Step 14100 of FIG. 12B, since no free storage control module was able to be located, the load balancing program needs to find a storage control module that can be released and reassigned to take over some portion of the excess load of the overloaded storage control module. Further, the load of the released storage module needs to be taken over by some other storage control module which is running the same type of storage control software. Accordingly, the load balancing program searches the storage control module management table 2902 to locate storage control modules 2200 which employ different types of storage control software from the storage control software running on the over loaded storage control module.

At Step 14110, if two or more storage control modules are found have the same type storage control software that is different from the type on the overloaded storage control module, the process goes to step 14120. On the other hand, if two or more such storage control modules are not found, then at step 14180 the load balancing program ends because there is no appropriate migration target. In this case, the program might send an error message to the administrator who can then determine manually whether one of the storage control modules is able to be released or whether a new storage control module should be added to achieve load balancing.

At Step 14120, the load balancing program 2907 searches the load management table 2908, and selects one of the found storage control modules from among the two or more storage control modules located in step 14100. There are various ways of selecting storage control module. In a preferred method, the storage control module selected to be released in the one of the found storage control modules having the lowest measured load, as determined by referring to load management table 2908 for each of the found storage control modules. However, the invention is not limited to a particular selection method.

At Step 14130, the load balancing program releases the storage control software from the selected storage control module selected at step 14120, and the load balancing program receives a release number. The release process is performed by invoking the storage control module management program 2901 to carry out steps 12000-12090, as described above with reference to FIG. 10. Because these steps were described in detail above, they do not need to be described again here.

At Step 14140, following completion of step 12090 to finish release of the selected storage control module and return of the release number, the load balancing program 2907 searches the volume release management table 2906 to find volume numbers corresponding to the returned release number in order to reassign the released volumes to one or more of the other storage control modules that are running the same storage control software as the selected released storage control module. If there are multiple other storage control modules running the same storage control software, there are various ways of selecting which of these will take over the I/O operations of the released storage control module. A preferred method is to select the storage control module having the lowest load by referring to load balancing table 2908. However, the invention is not limited to a particular selection method. Moreover, when multiple storage control modules are running the same storage control software as the released storage control module, multiple storage control modules could take over the released volumes in order to distribute the computational load across the multiple storage control modules, since if just one storage control module takes over the volumes, that storage control module might end up being overloaded also. There are various ways of determining volume distribution across multiple storage control modules, and thus, the invention is not limited to a particular volume distribution method.

At Step 14150, the load balancing program 2907 invokes the volume provisioning program 2904 with parameters such as the volume numbers and assigned host WWN that were previously assigned to the released storage control module. The volume numbers and host WWN can be retrieved from the volume release management table 2906' by using the release number (host WWN is contained in the LUN security entry 29067).

At Step 14160, the volume provisioning program carries out steps 11170-11190 of the process illustrated in FIG. 9C to define the paths for the reassigned volumes so that a host computer is able to access the re-assigned volumes through a specified port of the reassigned storage control module. Following completion of the path definition for the reassigned volumes, the migration target storage control module is free to be used for load balancing, and the procedure goes to 14190 of FIG. 12C.

At Step 14190 of FIG. 12C, the load balancing program 2907 decides which volumes at the overloaded storage control module should be migrated to the free storage control module. There are various ways of selecting the volumes to be targeted for migration. One method is based on the volume numbers of the volumes. For example, if the volumes are numbered from lower to higher, half of the volumes having lower volume numbers may remain at the overloaded storage control module, while the half of the volumes having higher volume numbers may be targeted for migration to the free storage control module. Under another method, the frequency of access to the volumes by the host may be measured, and the volumes distributed substantially equally according to the measured access frequency. Still alternatively, an administrator may manually select the volumes to be moved. Other methods will also be apparent in view of the disclosure, and the invention is not limited to a particular method.

At Step 14200, the load balancing program 2907 invokes host computer management program 1111 on management computer to disconnect the host computer(s) related to the target volumes selected at step 14190. In an alternative method, an administrator can specify the disconnecting of the host manually.

At Step 14210, the load balancing program 2907 invokes the volume release and assign program 2905 in order to release the migration targeted volumes from the overloaded storage control module.

At Step 14220, the volume release and assign program 2905 releases the paths to the targeted volumes. Typical release operations include updating volume management table 2911 of FIG. 5 by deleting the value of "Assigned Storage Control Module Number" entry 29112 and "Associated Storage Control Module WWN" entry 29113). Although the volume management information is deleted, the volume and the data itself are still present in the storage system. Then, the data can be utilized at such a time as when the volumes are reallocated. Thus, under this method, it is not necessary to backup the data on the volumes when they are released and then restore the data to the volumes at the time of reallocation, since the data remains present in the storage devices. Of course, if it is anticipated that the volumes will not be reallocated, or if physical storage space containing the volume data is required for other uses, then the data of the volumes may be backed up to a backup device.

At Step 14240, the volume release and assign program 2905 releases LUN security to the released volumes. Typical release operations are to update the LUN security table 2912 of FIG. 6 by deleting the entry for "WWN of Host that is Permitted Access" 29122.

At Step 14250, the volume release and assign program 2905 generates a release number and updates volume release management table (i.e., adds a new entry for the release).

At Step 14260, the volume release and assign program returns the release number to the load balancing program 2907.

At Step 14270, the load balancing program searches the volume release management table 2906 to find volume numbers for the returned release number in order to reassign the volumes to the migration target storage control module which is the free storage control module released or located in the processes of FIG. 12B or 12A, respectively.

At Step 14280, the load balancing program invokes the volume provisioning program using parameters such as the released volume numbers and assigned host WWN to the released volumes. The volume numbers and host WWN can be retrieved from the volume release management table 2906' by using the release number and LUN security information. The volume provisioning program 2904 carries out steps 11170-11190 of FIG. 9C, as described above with respect to FIG. 9C, for defining the paths of the assigned volumes. Because these steps were described in detail above, they do not need to be described again here. If the host WWN information is not preserved in the volume release management table such as table 2906 of FIG. 7A instead of table 2906' of FIG. 7B, the administrator can specify the host WWN information via storage management I/F program 1111 on management computer 1100. After completing the above procedure, a host computer is able to access the re-assigned volumes through a specified port of the reassigned storage control module.

Second Embodiments

Figure 13:
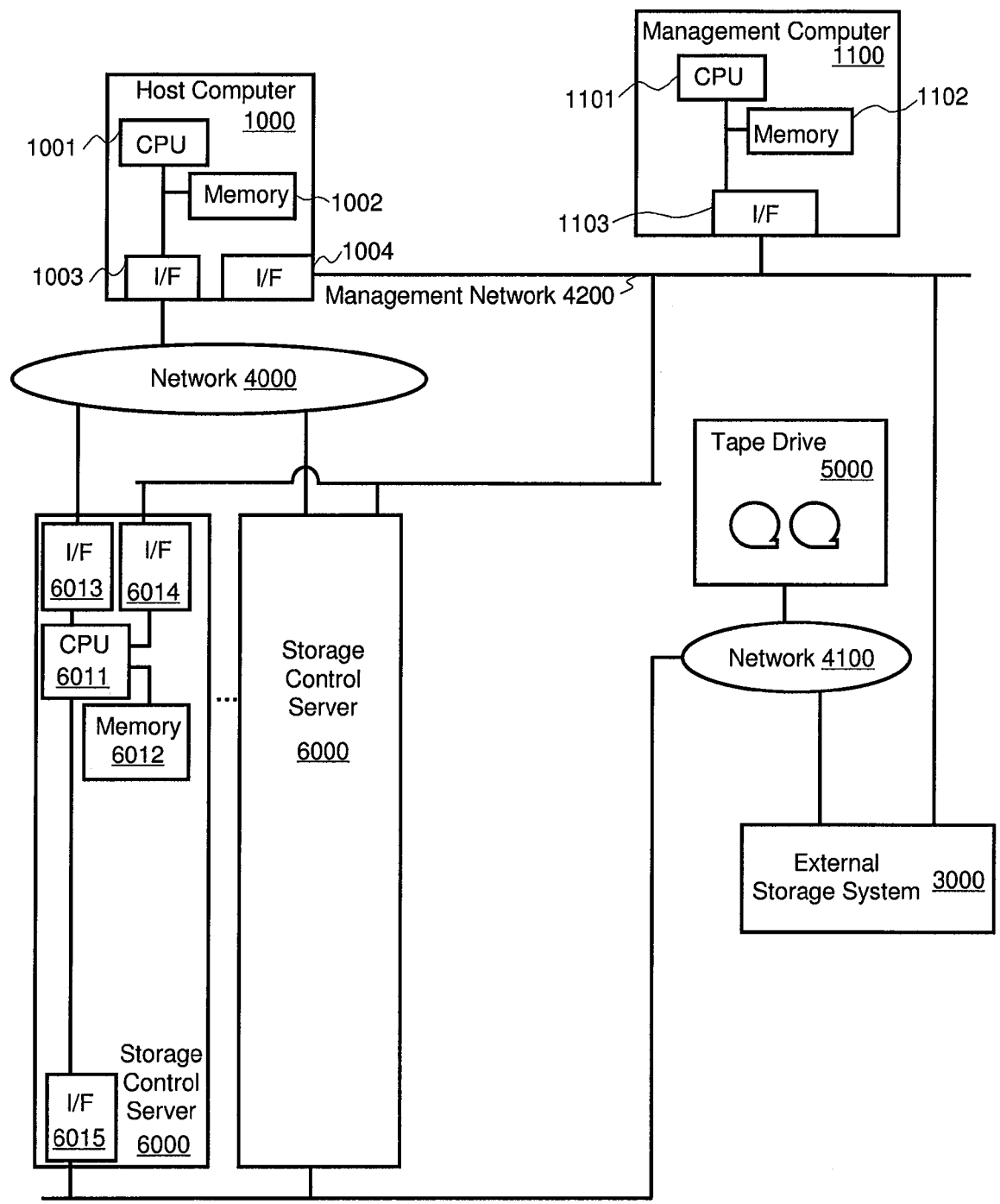
FIG. 13 illustrates another example of a hardware configuration in which the method and apparatus of the invention may be applied.

Another hardware and software configuration of the invention is described in the second embodiments of the invention. A typical hardware configuration of a storage system of the second embodiments of the invention is illustrated in FIG. 13. In the second embodiments, multiple storage control servers 6000 are employed instead of a storage system 2000 having multiple storage control modules 2200, as in the first embodiments. Because hardware elements, such as CPU have been standardized, the storage control module 2200 can be developed using standardized hardware. Accordingly, the storage control modules having standardized hardware can be replaced by standardized computers or appliances connected to one or more external storage systems 3000, which may be conventional storage systems, rather than the unified storage systems of the invention.

The hardware configuration of the storage control server 6000 is similar or the same as for a storage control module 2200 of the first embodiments. Accordingly each storage control server 6000 includes a CPU 6011, a memory 6012, a first interface 6013 for connecting to network 4000, a second interface 6014 for connecting to management network 4200, and a third interface 6015 for connecting to network 4100 and external storage system 3000. One difference is that storage controller 2100 includes a cache 2130 because the storage controller is a part of storage system 2000. However, servers 6000 do not necessarily have a cache, but may include a cache in some installations.

Under both the first and second embodiments, all or part of the storage management related programs and tables located on the storage management module can reside in the management computer 1100. Also, the storage control software repository can also be placed in the management computer 1100 or other external server. The distance between the repository and storage system does not affect the overall function of the present invention. Thus, the software repository may be located at a different site across a Wide Area Network (WAN), such as being accessible through the Internet, or the like. Further, in order to use the same process flows as set forth in the first embodiments described above, some minor changes may be made to program and table location and inter-program communications. However, these changes do not affect the functionality of the core process flows of the invention, such as for installing storage control software, uninstalling storage control software, reinstalling storage control software, and load balancing.

Figure 14:
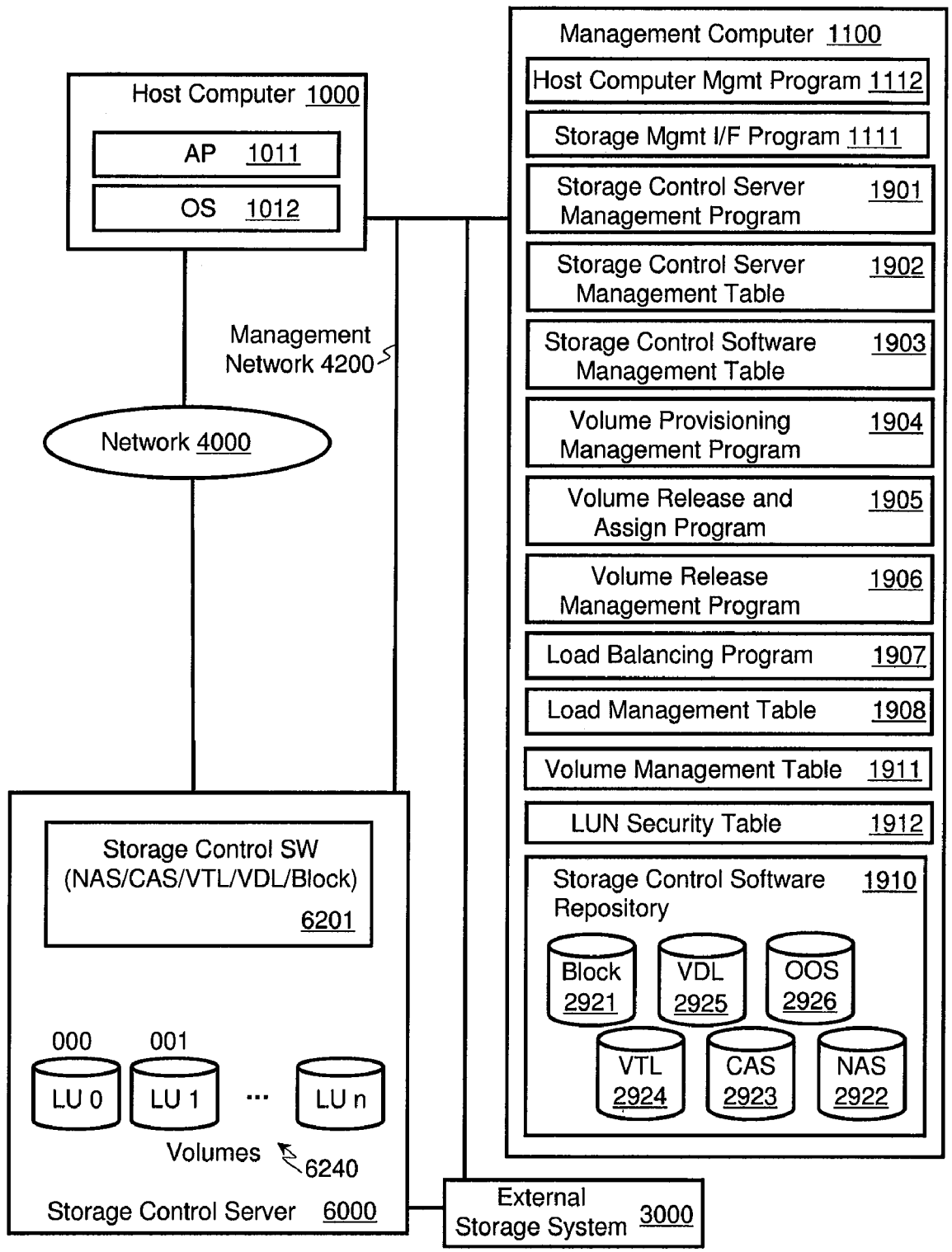
FIG. 14 illustrates an example of a logical configuration of the invention applied to the architecture of FIG. 13.

FIG. 14 illustrates an example of a logical configuration according to the hardware configuration of FIG. 13. Because of the hardware configuration change, some software configurations also need to be changed. For example, because there is no storage management module in the configuration of FIG. 13, the management computer 1100 takes over the tasks of the storage management module of the first embodiments. However, this control related software location change does not affect to the core control flow of the invention.

For example, management computer 1100, in addition to including the host computer management program 1112 and the storage management interface program 1111, also includes a storage control server program 1901 that performs function similar to the storage control module management program 2901 of the first embodiments. Also included in management computer 1100 are a storage control server management table which contains the same information as table 2902, a storage control software table 1903 which contains the same information as table 2903, a volume provisioning management program 1904 which performs functions similar to program 2904, a volume release and assign program 1905 which performs functions similar to program 2905, a volume release management program 1906 which performs functions similar to program 2906, a load balancing program 1907 which performs function similar to program 2907, a load management table 1908 which contains the same information as table 2908, a volume management table 1911 which contains the same information as table 2911, and a LUN security table 1912 which contains the same information as table 2912. As discussed above, a storage control software repository 1910 may also be contained in management computer 1100, or in other locations available over networks 4000, 4200, 4100.

Further, if a network switch (not shown) is utilized as part of the connection between storage control servers 6000 and storage system 3000, zoning might be assigned. The zoning assignments should be performed at the path definition phase such as immediately before or after the LUN security setting step. The software configuration of the storage control server 6000 in the second embodiments may be the same as the software configuration of the storage control module 2200 in the first embodiments, and includes volumes 6240 and storage control software 6201. Thus, servers 6000 are able to present volumes 6240 to host computers 1000, even though that data is physically stored on external storage system 3000.

I/F Protocol Stack Change

In the above described embodiments, the entire storage control software is replaced by different storage control software when changing the role of a storage control module 2200 or server 6000. However, it is also possible to just replace the interface protocol used. For example, FC and iSCSI can be replaced according to a replacement of interface hardware. For example, one process that may be used to accomplish interface protocol replacement is to release the original protocol stack from the storage control software, and install a new protocol stack to the storage control software, such as from the storage management module 2900. The host side configuration such as LUN security and zoning might be changed at the step of path definition according to the protocol stack replacement. However, the other configurations do not necessarily have to change.

The invention teaches methods and apparatuses for providing a unified storage system. The unified storage system is able to flexibly change the storage control software such as block, NAS, CAS, VTL, VDL, and OOS running on the storage control module (i.e., standard hardware). The invention may be used to perform storage control module role changes depending on time, replacement of a storage control module replacement, or the addition of a storage control module. The storage system is also able to reconfigure the assigned roles of storage control modules dynamically to automatically carry out load balancing.

Thus, it may be seen that the invention provides methods and apparatuses for a unified storage system that is able to run various types of storage control software, and further, is able to switch between the various storage control software for load balancing purposes. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the above description has been made in an illustrative fashion, and not a restrictive one. Accordingly, the scope of the invention should properly be determined with reference to the appended claims, along with the full range of equivalents to which such claims are entitled.

What is claimed is:

1. A method of controlling a storage system comprising:
providing a plurality of storage control processors, each said storage control processor connected for communication with one or more storage devices, said one or more storage devices storing data related to input/output (I/O) operations processed by said one or more storage control processors;
installing a first type of storage control software on a first storage control processor of said plurality of storage control processors for processing a first type of said I/O operations;
maintaining status of each of said plurality of storage control processors;
storing configuration information of a plurality of first volumes controlled by said first type of storage control software and LUN security information;
stopping said first type of storage control software on said first storage control processor;
releasing said plurality of first volumes from being accessed by said first storage control processor; and
reallocating said first type of storage control software to a second storage control processor of said storage control processors by redefining paths to said plurality of first volumes using said configuration information of said plurality of first volumes, and utilizing data stored in said plurality of first volumes and said LUN security information preserved before the releasing,
wherein said status maintained is referred to for the releasing.

2. The method according to claim 1,
wherein by the reallocating the first storage control processor is replaced by the second storage control processor dynamically.

3. The method according to claim 1,
wherein during the releasing, a release number is generated to preserve the configuration information associated with the first storage control processor.

4. The method according to claim 3,
wherein the preserved configuration information includes type of storage control software specified for accessing said plurality of first volumes.

5. The method according to claim 4, further comprising:
determining to release said first storage control processor if a parameter of said first storage control processor exceeds a threshold.

6. The method according to claim 5, further comprising:
measuring performance of said plurality of storage control processors.

7. The method according to claim 6, further comprising:
said measuring includes measuring load, number of connections, and port throughput for each of said plurality of storage control processors.

8. The method according to claim 3,
wherein the status includes whether each of said plurality of storage control processors is used or not.

9. The method according to claim 8, further comprising:
measuring performance of said plurality of storage control processors.

10. The method according to claim 9, further comprising:
said measuring includes measuring load, number of connections, and port throughput for each of said plurality of storage control processors.

11. The method according to claim 1,
wherein the status includes whether each of said plurality of storage control processors is used or not.

12. The method according to claim 1, further comprising:
determining to release said first storage control processor if a parameter of said first storage control processor exceeds a threshold.

13. The method according to claim 12, further comprising:
measuring performance of said plurality of storage control processors.

14. The method according to claim 13, further comprising:
said measuring includes measuring load, number of connections, and port throughput for each of said plurality of storage control processors.

* * * * *